(12) United States Patent
Johnson et al.

(10) Patent No.: US 8,751,100 B2
(45) Date of Patent: Jun. 10, 2014

(54) METHOD FOR PERFORMING DIAGNOSTICS OR SOFTWARE MAINTENANCE FOR A VEHICLE

(75) Inventors: Michael R. Johnson, Moline, IL (US); Daniel Colavita, Columbia, MD (US); Tammy R. Pullen, Hanover, MD (US)

(73) Assignee: Deere & Company, Moline, IL (US)

( * ) Notice: Subject to any disclaimer, the term of this patent is extended or adjusted under 35 U.S.C. 154(b) by 503 days.

(21) Appl. No.: 12/879,154

(22) Filed: Sep. 10, 2010

(65) Prior Publication Data

US 2012/0041638 A1 Feb. 16, 2012

Related U.S. Application Data

(60) Provisional application No. 61/373,493, filed on Aug. 13, 2010.

(51) Int. Cl.
*G01M 17/00* (2006.01)
*G01F 7/00* (2006.01)

(52) U.S. Cl.
USPC ............... 701/33.1; 700/31; 700/32; 700/33

(58) Field of Classification Search
None
See application file for complete search history.

(56) References Cited

U.S. PATENT DOCUMENTS

| | | |
|---|---|---|
| 6,181,992 B1 | 1/2001 | Gurne et al. |
| 6,782,313 B1 | 8/2004 | Frech et al. |
| 7,506,309 B2 * | 3/2009 | Schaefer ............... 717/120 |
| 7,532,963 B1 | 5/2009 | Lowrey et al. |
| 2004/0039500 A1 | 2/2004 | Amendola et al. |
| 2005/0216903 A1 * | 9/2005 | Schaefer ............... 717/168 |

OTHER PUBLICATIONS

International Search Report, dated Jan. 10, 2012 (2 pages).

* cited by examiner

*Primary Examiner* — Ian Jen

(57) ABSTRACT

A method for performing diagnostics or software maintenance on a vehicle comprises storing components of configuration files in a central processing system. An update of the configuration files is requested for the vehicle from a central electronic data processing system based on a user request. The requested update of components of configuration files are received from the central electronic data processing system based on a comparison of a record of the vehicle-installed configuration files and target configuration information on configuration files stored at the central electronic data processing system.

17 Claims, 13 Drawing Sheets

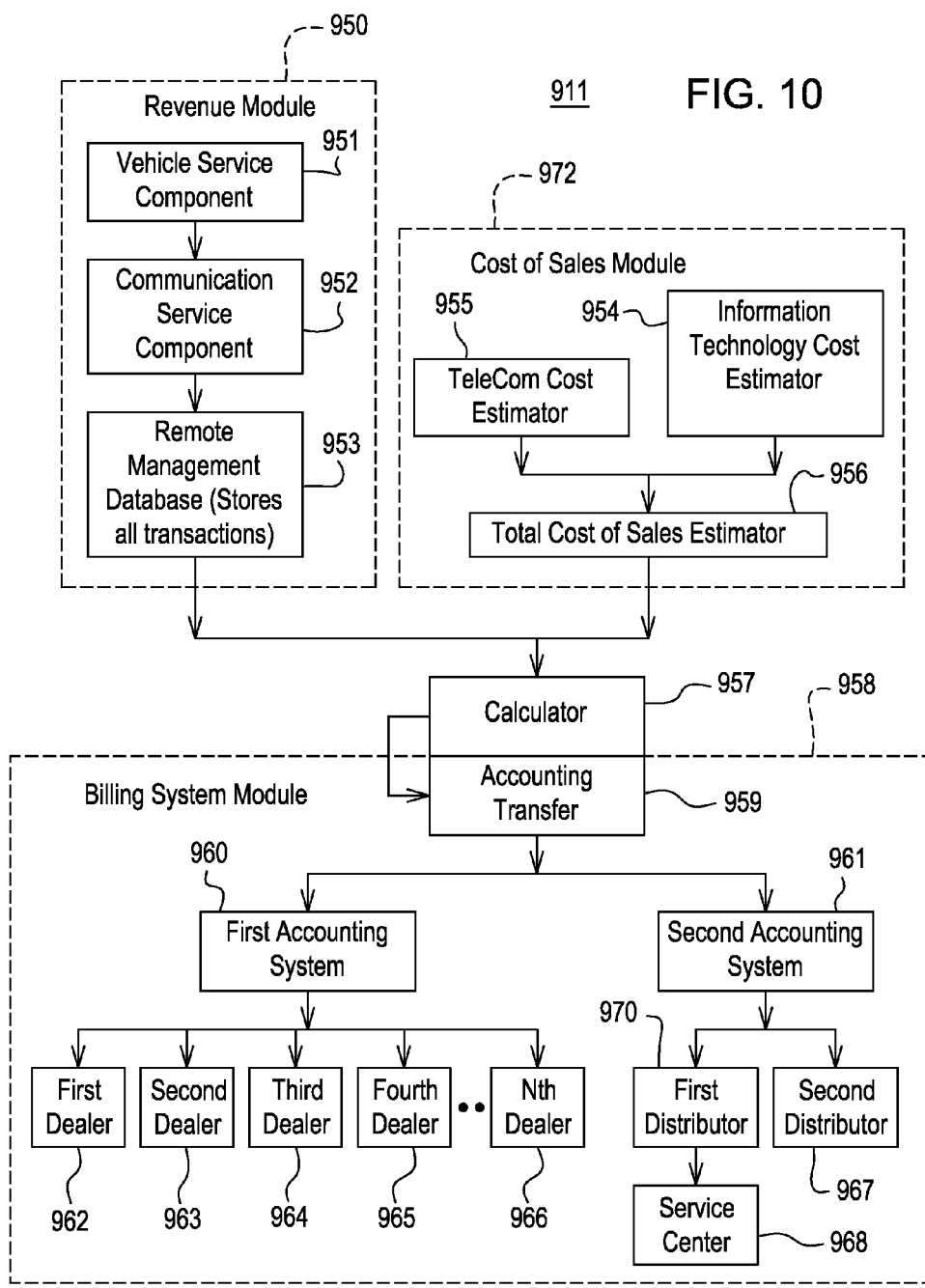

METHOD FOR PERFORMING DIAGNOSTICS OR SOFTWARE MAINTENANCE FOR A VEHICLE

This document (including the drawings) claims priority and the benefit of the filing date based on U.S. provisional application No. 61/373,493, filed Aug. 13, 2010 under 35 U.S.C. §119 (e), where the provisional application is hereby incorporated by reference herein.

FIELD OF THE INVENTION

This invention relates to a method for performing diagnostics or software maintenance for a vehicle.

BACKGROUND OF THE INVENTION

In certain prior art, remote diagnostics and analysis of the performance of vehicle may require the storage and transmission of entire configuration files from a central processing center to vehicle electronics. Such transmission tends to inefficiently use one or more communications channels between central processing center and vehicle electronic. A land-based communication channel might be unavailable or unreliable where the vehicle and associated vehicle electronics are located in rural areas such that a satellite communications channel is required. For example, the transmission of entire configuration files, and hence remote diagnostics, may not be economically feasible, where more expensive satellite communications channels are required to handle a significant throughput of data in entire configuration files.

In some prior art, remote diagnostics and analysis of the performance of vehicles may require distinct software payloads to accommodate both local connection to the vehicle, via a wireline or short-range wireless connection, or remote connection to the vehicle, via a wireless communications system. The distinct software payloads tend to require duplicative software that can tax the software processing capability or data processing throughput of the vehicle electronics. For example, software updates or diagnostics processed by the vehicle electronics may perform more slowly because of duplicative software, or other software on the vehicle electronics may perform slowly where less data processing resources are available.

In certain prior art, the diagnostic capabilities may be limited to the transmission rate capacity of a vehicle data bus, such as a controller area network (CAN) data bus. Accordingly, engine control events that occur at higher rates than the transmission rate capacity of the vehicle data bus may be ignored in certain prior art diagnostic systems, which can lead to less accurate or more time-consuming diagnostic procedures.

Thus, there is a need to enhance the efficiency and performance of a method for performing remote diagnostics of a vehicle to address the above referenced problems.

SUMMARY OF THE INVENTION

In accordance with one embodiment, a method for performing diagnostics or software maintenance on a vehicle comprises storing components of configuration files in, or accessible by, a central data processing system. An update of the configuration files is requested for the vehicle from a central electronic data processing system based on a user request. The requested update of components of configuration files are received from the central electronic data processing system based on a comparison of a record of the vehicle-installed configuration files and target configuration information on configuration files stored at the central electronic data processing system.

BRIEF DESCRIPTION OF THE DRAWINGS

FIG. 10 is a block diagram of the billing system for performing of diagnostics and software maintenance for a vehicle.

DESCRIPTION OF THE PREFERRED EMBODIMENT

Figure 1:
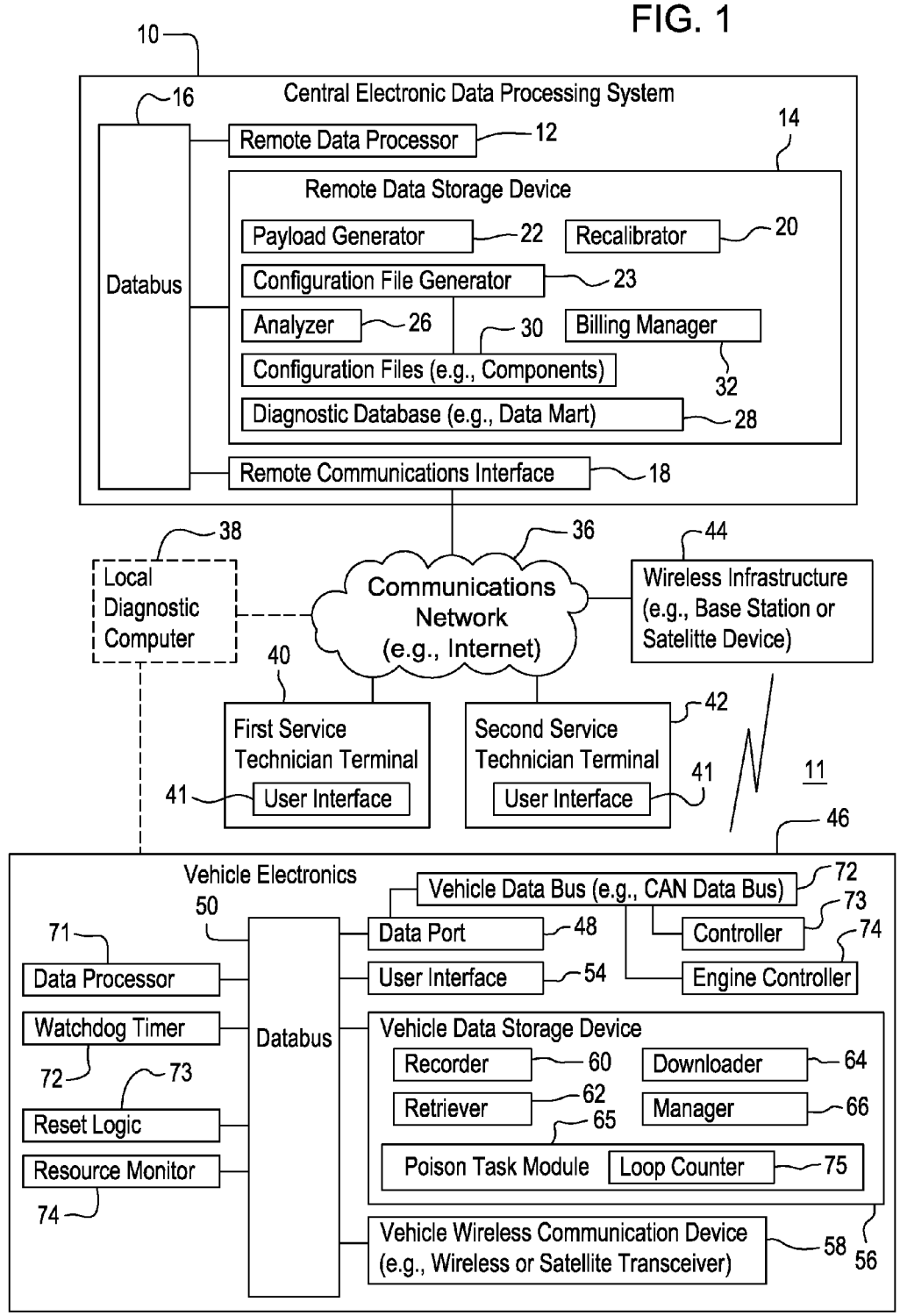
FIG. 1 is block diagram of a system for performing diagnostics or software maintenance of vehicle electronics in accordance with the invention.

In accordance with one embodiment, FIG. 1 illustrates a remote diagnostic system 11. In one embodiment, the remote diagnostic system 11 comprises a central electronic data processing system 10 that is capable of communicating with vehicle electronics 46 via a communications network 36 and wireless infrastructure 44.

The central electronic data processing system 10 and wireless infrastructure 44 are coupled to an electronic communications network 36 (e.g., the Internet). One or more service technician terminals (e.g., first service technician terminal 40 and a second service technician terminal 42) are capable of communicating with the central electronic data processing system 10 via the communications network 36. One or more service technician terminals (40, 42) are capable of communicating with the vehicle electronics 46 via the communications network 36 and the wireless infrastructure 44.

In an alternative embodiment, a service technician or user may use a local diagnostic computer 38 that communicates, directly, to the vehicle electronics 46 via a short-range wireless connection, a wireline connection, or another local connection. For example, the services technician might use the local diagnostic computer 38 to communicate with the vehicle electronics 46, if a vehicle is located in or brought to a service center, where the service technician works. Otherwise, the service technician can perform remotely some of many diagnostic and software reprogramming tasks via the communications network 36 and the wireless infrastructure 44.

The central electronic data processing system 10 comprises a remote data processor 12, a remote data storage device 14, and a remote communications interface 18 coupled to a data bus 16. In one embodiment, the central electronic data processing system 10 may be implemented by a general purpose computer or a server that is programmed with software modules stored in the remote data storage device 14. The remote data processor 12 is capable of communicating with the one or more of the following via the data bus 16: the remote data storage device 14 and remote communications interface 18. The remote data storage device 14 stores one or more of the following software modules, data structures or files: a payload generator 22, a configuration file generator 23, a recalibrator 20, a common messaging interface, a billing manager 32, configuration files 30 (e.g., components of configuration files 30), an analyzer 26 and a diagnostic database 28 (e.g., data mart).

The remote data processor 12 may comprise a microprocessor, a microcontroller, a central processing unit, a programmable logic array, an application specific integrated circuit (ASIC), a logic circuit, an arithmetic logic unit, or another data processing system 10 for processing, storing, retrieving, or manipulating electronic data.

The remote data storage device 14 comprises electronic memory, nonvolatile random access memory, an optical storage device, a magnetic storage device, or another device for storing and accessing electronic data on any recordable, rewritable, or readable electronic, optical, or magnetic storage medium.

The remote communications interface 18 may comprise a transceiver or other device for communicating, transmitting, or receiving data via the communications network 36. In one embodiment, the communications network 36 comprise the Internet, the public switched telephone network (PSTN) or another public, or private electronic communications network 36, or a communications link (e.g., telecommunications line or microwave link) that supports communication to or from the wireless infrastructure 44.

The payload generator 22 comprises a software module or instructions for organizing, assembling or generating payloads or components of configuration files for programming or reprogramming of one or more of the following devices: the vehicle electronics 46, a controller 73, or an engine controller 74. The payload generator 22 may read configuration files 30 or components of configuration files that are as-installed in the vehicle electronics 46 for a particular vehicle with a vehicle identifier or a machine identifier. The payload generator 22 may also read target configurations for a corresponding vehicle identifier or a machine identifier, where the target configurations are stored in the remote data storage device 14 or are accessible by the central electronic data processing system 10. The target configurations are typically established by the manufacturer of the vehicle or the supplier of various electronic modules for the vehicle.

The recalibrator 20 comprises a software module or instructions for organizing, assembling or generating calibration data for programming, reprogramming or setting the state or value of parameters of one or more of the following devices: the vehicle electronics 46, a controller 73, or an engine controller 74. The recalibrator 20 may read configuration files 30, components of configuration files, or calibration data that represents as-installed calibration data (e.g., factory or manufacturer settings for parameters) in the vehicle electronics 46 for a particular vehicle with a vehicle identifier or a machine identifier. The recalibrator 20 may also read target calibrations for a corresponding vehicle identifier or a machine identifier, where the target calibrations are stored in the remote data storage device 14 or are accessible by the central electronic data processing system 10. The target calibrations may be established by the manufacturer of the vehicle, a supplier of various electronic modules for the vehicle, or a service technician or an engineer such that the vehicle meets certain performance standards, emission standards, fuel economy goals, or other goals consistent with customer satisfaction and regulatory requirements. The recalibrator 20 is capable of performing automatic recalibration of components of the vehicle electronics 46 that are out of a target range of parameter values. The recalibrator 20 may perform such automatic recalibration in response to the results of a diagnostic report message provided by the data processing system 10 or the analyzer 26.

The configuration file generator 23 comprises a software module or instructions for generating, manages, archives, stores and retrieves configuration data for corresponding vehicles with respective vehicle identifiers. The configuration data may pertain to components of configuration files for downloading as payloads or provision to the vehicle electronics. The configuration file may store configuration files 30 or components of configuration files that may be organized or rearranged because of the modular format of the components of the configuration files.

An analyzer 26 comprises a software module or instructions for analyzing the results of diagnostic tests, fault codes, error messages, status messages, or test results provided by the vehicle electronics 46 to the central electronic data processing system 10 via the wireless infrastructure 44 and the communications network 36.

A diagnostic database 28 comprises a database or another collection of data records or files that may be used to store the diagnostic history of vehicles or corresponding vehicles with respective vehicle identifiers. Further, the diagnostic database 28 may contain benchmark vehicle models or benchmark vehicle performance models that provide benchmark values of measurements of the vehicle electronics 46 to facilitate identification of abnormal operational conditions, for instance.

In one embodiment, the billing manger 32 may include at least a portion of the billing system 911 of FIG. 10. The billing manager 32 comprises a software module or instructions for facilitating billing for the provision of diagnostics, remote programming, local programming, or other technical support of the vehicle electronics 46 and associated controllers (73, 74).

The first service technician terminal 40 and the second service technician terminal 42 each comprise a computer. The first service technician terminal 40 and the second service technician terminal 42 each comprise a user interface 41. A user interface 41 may comprise a keypad, a keyboard, a pointing device (e.g., electronic mouse), a display, or another device for inputting or outputting data from the first service technician terminal 40, the second service technician terminal 42, or another computer.

The wireless infrastructure 44 supports wireless communications between the vehicle electronics 46 and one or more of the following devices: a first service technician terminal 40, a second service technician terminal 42, and a central electronic data processing system 10. The wireless infrastructure 44 may comprise one or more of the following: one more wireless base stations that are capable of communicating over the communications network 36 via a gateway an Internet service provider, or otherwise; one or more satellite transceivers; a satellite downlink receiver, a satellite uplink transmitter; a satellite communications system; a cellular infrastructure network; a trunking system, a point-to-multipoint communications system, a point-to-point communications link, a land-based wireless communications network 36, or the like.

The vehicle electronics 46 comprises a vehicle data processor 71, a vehicle data storage device 56, and a vehicle wireless communications device 58, a data port 48, a user interface 54, a vehicle data bus (e.g., controller area network (CAN) data bus) 72, a controller 73, and an engine controller 74. The data processor 71 is capable of communicating with one or more of the following devices via a data bus 16: the vehicle data storage device 56, the data port 48, user interface 54, and the vehicle wireless communications device 58.

The data port 48 provides an interface, such as common memory between a data bus 50 and a vehicle data bus 72. A controller 73 and an engine controller 74 are coupled to the vehicle data bus 72. The controller 73 and the engine controller 74 may have electronic memory (e.g., nonvolatile random access memory) or another storage device for storing, retrieving and processing payload data, calibration data, configuration data, payloads, components of configuration files or other computer instructions that are downloaded or provided via the local diagnostic computer 38 or via the electronic data processing system 10.

The vehicle data storage device 56 stores or contains one or more of the following software modules, data structures, or files a recorder 60, a retriever 62, a downloader 64, and a manager 66. A recorder 60 comprises a software module or instructions for recording data collected by the controller 73, engine controller 74, a sensor, an actuator, a network device coupled to or capable of communication to the vehicle data bus 72, or another sensor or measurement device for sending or measuring parameters, conditions or status of the vehicle electronics 46, vehicle systems, or vehicle components. A downloader 64 comprises a software module or instructions that facilitate downloading, monitoring of downloading, and communicating one or more of the following: payload, configuration data, parameter settings, calibration data, components of configuration files, software modules, or the like. A manager 66 comprises a software module or instructions that facilitate installation, monitoring, managing, and reverting or rolling back of one or more of the following: payload, configuration data, parameter settings, calibration data, components of configuration files, software modules, or the like. A retriever 62 comprises a software module or instructions for responding to status inquiries on the state (e.g. installation state) or versions of software modules, payloads, configuration data, calibration data, components of configuration files, technical specifications, processor configuration, input/output configuration, operating system software, hardware settings, hardware architecture, or other information related to one or more controllers (73, 74), the vehicle electronics 46, or software installed on either.

The vehicle data processor 71 may comprise a microprocessor, a microcontroller, a central processing unit, a programmable logic array, an application specific integrated circuit, a logic circuit, an arithmetic logic unit, or another data processing system for processing, storing, retrieving, or manipulating electronic data.

The vehicle data storage device 56 comprises electronic memory, nonvolatile random access memory, an optical storage device, a magnetic storage device, or another device for storing and accessing electronic data on any recordable, rewritable, or readable electronic, optical, or magnetic storage medium.

A user interface 54 comprises one or more of the following: a keypad, a keyboard, a touch screen display, a switch, a pointing device (e.g., electronic mouse), a display (e.g., liquid crystal display or plasma display), or another device for inputting, entering selecting, receiving, or displaying input or output data for a computer, controller, electronics or other electronic data processing system.

The data port 48 may comprise an input/output data port 48, such as an UART, a data transceiver with buffer memory, a device that supports communications with the local diagnostic computer 38, or an interface device that supports communication between the data bus 50 and the vehicle data bus 72.

In an alternate embodiment, the data port 48 may comprise a short-range wireless connection, such as IEEE (Institute of Electrical and Electronics Engineers) 802.11 connection or a blue-tooth wireless connection. The data port 48 supports a connection, transmission, receipt or exchange of data between the vehicle electronics 46 and the local diagnostic computer 38.

In another alternate embodiment, the remote data storage device 14 or the vehicle data storage device 56 comprises or stores a common messaging interface for communication with vehicle electronics 46, the common message interface providing a communications interface between the vehicle electronics 46 and at least one application program.

In FIG. 1, the vehicle electronics 46 further comprises a resource monitor 74, a watchdog timer 72, reset logic 73, a poison task module 65, and a loop counter 75. In one embodiment, the resource monitor 74, the watchdog timer 72, the reset logic 73, the poison task module 65, and the loop counter 75 may be used for detection and management of a poison message, poison task, or problematic software code that may consume excessive computational resources or cause the data processor 71 to become bogged down in a repetitive loop, that causes the data processor 71 to stop running software or certain software instructions, or that contributes to another unwanted process. As illustrated in FIG. 1, the resource monitor 74, the watchdog timer 72, and the reset logic 73 may communicate with the data processor 71 or the poison task module 75 (or the loop counter 75) in the vehicle data storage device 56 via the data bus 50. Further, the watchdog timer 72 and the reset logic 73 may communicate with each other via the data bus 50, or directly via a transmission line or an electrical conductor (not shown).

The resource monitor 74 comprises an electronic device or software instructions for monitoring the resource level consumption, processing throughput, processing duration, or processing capacity of the data processor 71, for a corresponding task performed or to be performed by the data processor 71. For example, resource monitor 74 may comprise a detector for detecting a request to or received by the data processor 71 to execute particular task, an executable file, executable software instructions or sets of instructions and a timer for timing the duration for data processing or completion by the data processor 71 of a corresponding task, an executable file or other executable software instructions or sets of instructions. A task refers to any discrete, identifiable process, procedure or series of processes and procedures that are applied to input data, output data, intermediate data derived from the input data, or a precursor to the output data by the data processor 71. For example, a task may include trigger-based recording of the performance of or diagnostic data associated with a controller 73 or an engine controller 74.

The watchdog timer 72 comprises a timer and a control circuit, an electronics device, or software instructions that control a maximum allowed time duration for each task or process to be performed by the data processor. In one embodiment, the watchdog timer 72 has a technician-definable or adjustable maximum allowed time duration that may be adjusted based on the particular application software and operating system (e.g., expected maximum duration for a data processor to execute a software loop, a particular task or a group of tasks) to be executed by the data processor 71. The watchdog timer 72 can be triggered by software (e.g., application software or a particular task in application software) where there is an infinite loop or an infinite loop at the interrupt level (e.g., in the application software or a particular task), for example. When the data processor 71 (e.g., microprocessor), the software or task executable thereby, and the requisite hardware supporting the data processor 71 is operating normally or with sufficient speed, the watchdog timer 72 ordinarily prevents the data processor 71 from being reset or rebooted by clearing a triggering flag or triggering value in a data register (prior to the expiration of a watchdog timeout period). However, when the data processor 71, the software or task executable thereby, or the requisite hardware supporting the data processor 71 is not operating normally or with sufficient speed, the watchdog timer 72 fails to clear or reset the triggering flag or triggering value in the data register, which upon expiration of the watchdog timeout period triggers reset logic 73 to reset or reboot the data processor 71. For example, the watchdog timer 72 may be unable to clear the triggering flag or triggering value in the data register if the data processor 71 is stuck in a loop, delays execution of a task or stops execution of a task while executing the task or executable file. Although the watchdog timer 72 and reset logic 73 are illustrated as separate blocks in FIG. 1, the watchdog timer 72 and the reset logic 73 may be integrated into a data processor 71.

The reset logic 73 comprises a logic circuit, a driver or software instructions to provide a digital signal, a logic level signal or other reset signal to the data processor 71 to reset or reboot the data processor 71. The reset logic 73 may be configured to send the reset signal via the data bus 50 to the data processor 71 or directly to a reset data input (not shown) of the data processor 71, which may vary from data processor device to data processor device.

As illustrated in FIG. 1, the vehicle storage device 56 further comprises a poison task module 65 and a loop counter 75. The poison task module 65 comprises program instructions for detecting one or more poison tasks, program instructions for managing one or more poison tasks, program instructions for segregating one or more poison tasks for non-execution, and program instructions for deleting one or more poison tasks.

A loop counter 75 comprises software instructions or an electronic counter for storing, accessing, retrieving, writing or reading data in one or more data storage registers or other data storage locations to track the number of times that a loop has been executed for a corresponding particular task of an executable program. As illustrated in FIG. 1, the loop counter 75 is stored within, accessible by, or managed by the poison task module 65. The loop counter 75 is stored in a manner such that turning off the vehicle electronics 46 or resetting or rebooting the data processor 71 does not disrupt or interfere with the ability to read or access data that has been previously stored in the loop counter 75.

Figure 2A:
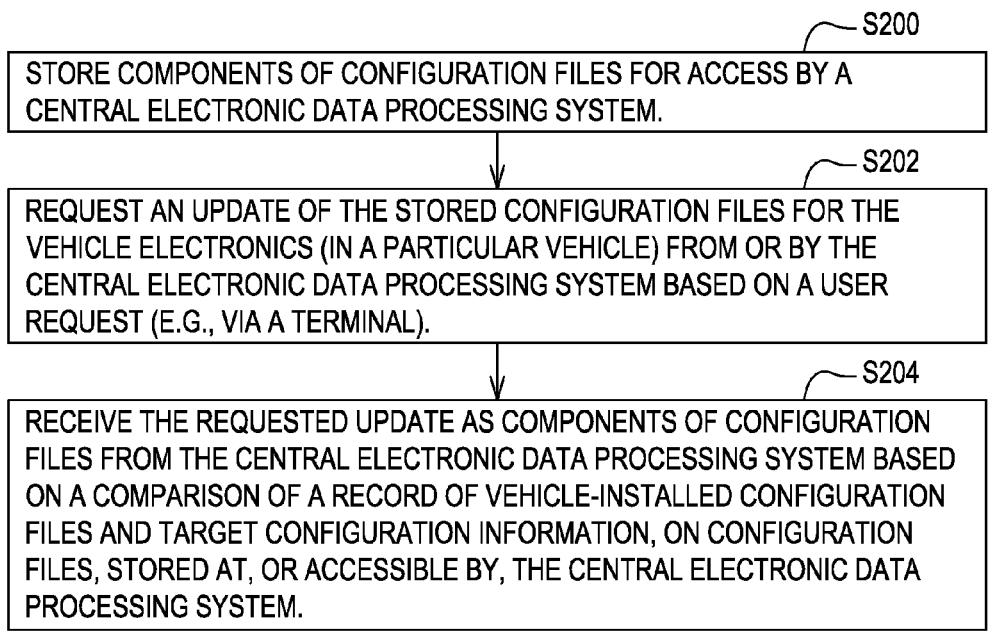
FIG. 2A is flow chart of one embodiment of a method for performing diagnostics or software maintenance of vehicle electronics.

FIG. 2A is a flow chart of one embodiment a method for performing diagnostics or software maintenance on a vehicle. The method of FIG. 2A begins in step S200.

In step S200, a central electronic data processing system 10 stores one or more components of configuration files 30 for access by the central electronic data processing system 10. For example, the components of configuration files 30 are organized as a modular set of files that support electronic communication between the central electronic data processing system 10 and vehicle electronics 46 or between a local diagnostic computer 38 and the vehicle electronics 46. The configuration files or components may be configured as payloads or configuration data that is suitable for remote transfer between the central data processing system 10 and the vehicle electronics 46 (e.g., or the controllers 73, 74), for example. Configuration data comprises software instructions, patches, components or modules that are based upon the configurations of the vehicle and the vehicle electronics 46. In general, the configuration data is functionally and operationally compatible with the engine controller 74 and the controller 73 for the particular vehicle, which may depend upon compatibility with the software operating system or hard-code in the controllers (73, 74) or the type (e.g., manufacturer) of data processors (e.g., microprocessors) used in the controllers (73, 74).

In step S202, the central electronic data processing system 10 or a service technician terminal (40, 42) requests an update of the stored configuration files 30 for the vehicle electronics 46, in a particular vehicle, from or by the central electronic data processing system 10. The requested update may be based on a user request (e.g., via a terminal 40, 42), or automatically generated by the central electronic data processing system 10 as part of a software upgrade cycle, after the lapse of a time period, for a product recall related to the vehicle, or upon the occurrence of another triggering event that is defined by a user or manufacturer of the vehicle.

In step S204, the vehicle electronics 46 receives the requested update as components of configuration files 30 from the central electronic data processing system 10 based on a comparison of a record of the vehicle-installed configuration files 30 and target configuration information on configuration files 30 stored at the central electronic data processing system 10 (or in the data storage device). For example, the vehicle electronics 46 receives the requested components of the configuration files via a communications network and wireless infrastructure, where the wireless infrastructure comprises a land-based wireless system, a satellite communications system, or both. The land-based wireless system may be used, except where it does not provide reliable coverage or a signal of suitable signal quality to the vehicle electronics 46 or the vehicle wireless communications device 58. The satellite communications system is used as an auxiliary communications system to the land-based wireless system, when or if the land-based system does not provide reliable coverage or a signal of suitable signal quality to the vehicle wireless communications device 58.

In one embodiment, the vehicle-installed configuration files 30 comprise an as-loaded list of software that is loaded on the vehicle electronics 46 (or associated controllers) in accordance with archived records of the central electronic data processing system 10. Prior to receiving components of the configuration files at the vehicle electronics 46, the data processing system 10 may verify that the vehicle-installed configuration files are current or up-to-date by sending a software status inquiry message from the central data processing system to the vehicle electronics 46, or controllers (73, 74) associated therewith or residing therein. The target configuration information on the configuration files 30 comprises a target list of software for loading on the vehicle, where the target list is associated with a corresponding valid time period. If the valid time period expires, the data processing system 10 may be programmed to update, or verify the status or accuracy of the target list of software, by contacting (e.g., via the communications network 36) a manufacturer of the vehicle or vehicle electronics or data records provided on behalf of the manufacturer of the vehicle or the vehicle electronics.

Alternatively, records of vehicle-installed configuration files 30 and corresponding target configuration for each vehicle may be stored at a one or more central databases that are accessible by the central electronic data processing system 10 via an electronic communications network 36, a local communications network 36 (e.g., Ethernet) or otherwise.

After updating the configuration or software in the vehicle electronics 46 (e.g., in step S204), the vehicle electronics 46 generates a return file or acknowledgement for transmission from the vehicle electronics 46 to the central data processing system 10 via the wireless infrastructure 44 and the communications network 36. The return file may contain a user identifier or hardware identifier of who initiated the reprogramming or requested the update (e.g., payload, component, configuration data or configuration file). Further, the return file may contain information on the Media Access Control (MAC) address or host identifier of a computer (e.g., first service technician terminal 40 or second service technician terminal 42) that initiated the reprogramming (e.g., of the components). The MAC address represents a unique identifier for computer hardware that is assigned by a manufacturer of the hardware.

For a remote programming environment, a non-programmed controller in the vehicle electronics 46 may generate a fault code when it cannot communicate with another controller (e.g., a controller being reprogrammed) temporarily during the reprogramming process. For example, vehicle electronics 46 may be instructed to reset automatically the above referenced fault code, or the operator (of the vehicle) may be provided with instructions to reset or clear such program fault codes manually.

The as-loaded software configuration or vehicle-installed configuration of a vehicle may be updated from time-to-time by one or more transmissions of components from the vehicle electronics 46 to the data processing system 10. For example, after vehicle electronics 46 of a vehicle are updated by installation or downloading of a software payload, the vehicle electronics 46 may generate an acknowledgement or status update of the current software that has been successfully installed on the vehicle electronics 46.

Figure 2B:
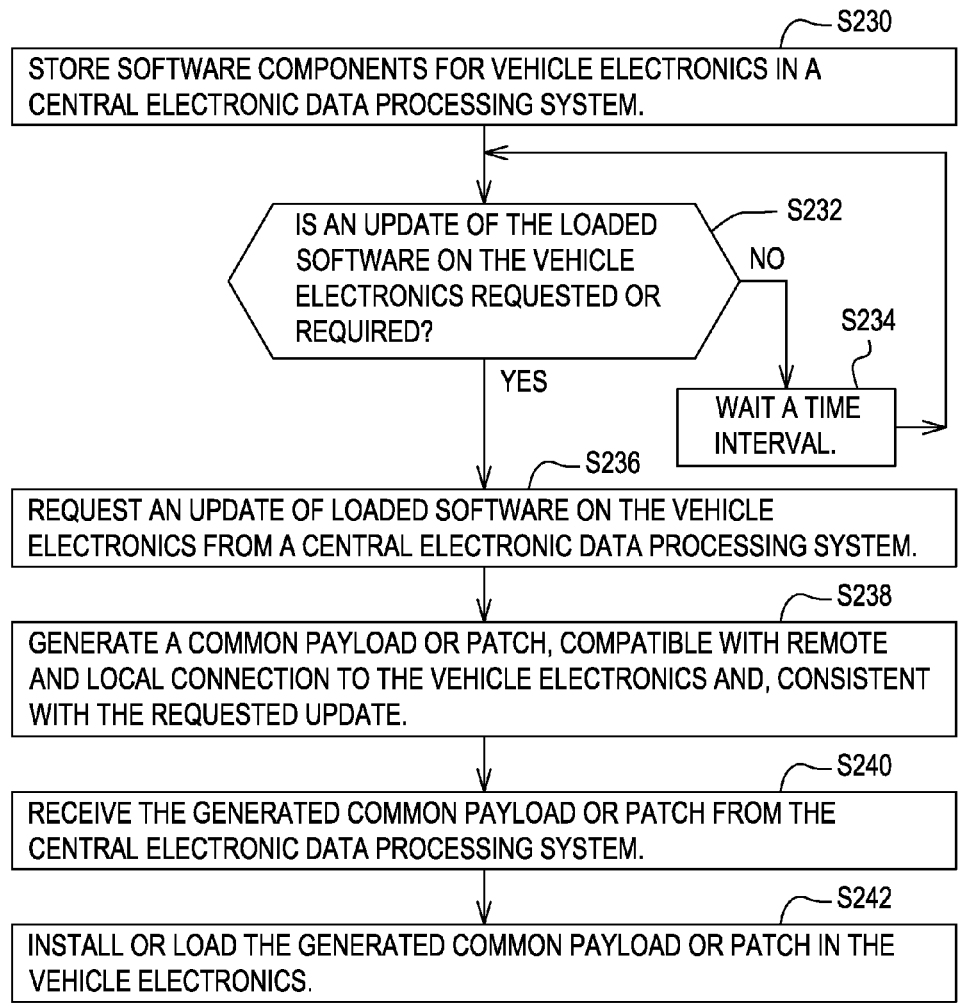
FIG. 2B is a flow chart of another embodiment of a method for performing diagnostics or software maintenance of vehicle electronics.

FIG. 2B relates to another embodiment of a method of performing remote diagnostics or software maintenance on a vehicle. The method of FIG. 2B begins in step S230.

In step S230, a central data processing system 10 or a remote data storage device 14 stores software components for vehicle electronics 46 in a central electronic data processing system 10 or in a separate database accessible by the electronic data processing system 10.

In step S232, the central data processing system 10 determines whether or not an update of the loaded software on the vehicle electronics 46 is requested or required. The update is requested, if it is requested by a user or technician that has been granted permission from a vehicle owner to perform diagnostics, to repair the vehicle, or to update or maintain software on the vehicle. The update is required, if the update is necessary to comply with the vehicle manufacturer's warranty, a product recall associated with the vehicle or vehicle electronics 46, an upgrade to the vehicle, or other manufacturer-provided instructions from the manufacturer of the vehicle. If the update is required or requested, the method continues with step S236. However, if the update is neither requested, nor required, the method continues with step S234.

In step S234, the central data processing system 10 waits a time interval prior to returning to step S232.

In step S236, the central data processing system 10 or a terminal (e.g., first service technician terminal 40 or a second service technician terminal 42) requests an update of loaded software on the vehicle electronics 46 from the central electronic data processing system 10. For example, a service technician may request an update of the loaded software while performing routine maintenance or service on the vehicle associated with the vehicle electronics 46.

In step S238, the central data processing system 10 generates a common payload or patch, compatible with remote and local connection to the vehicle electronics 46 and, consistent with the requested update. For example, the central data processing system 10 generates a payload in response to a request to update software on the vehicle electronics 46, or in one or more controllers (73, 74). In one embodiment, the common payload processing software dynamically assembles payloads that are machine specific and customized, as opposed to reprogramming an entire group of vehicles of the same model number with the same payload of software. To establish and assembly the dynamically assembled payload appropriate for the vehicle, the electronic data processing system 10 considers: (a) the difference between a record of the as-loaded software (e.g., stored or managed by the central data processing system 10) and the target software configuration and (b) the vehicle option configuration (e.g., factory options selected by the original purchaser). For example, the options may affect the engine torque curve, the transmission configuration, or other features.

A payload may comprise configuration data, calibration data, or both. Configuration data relates to a particular configuration of the vehicle electronics 46, a controller, a vehicle system or a vehicle in which one or more vehicle features are active, inactive, or set to match selected vehicle options (e.g., factory vehicle options as ordered on the original vehicle). Calibration data may relate to settings of parameters that may be adjusted to meet various requirements or engineering operational standards. Calibration data may relate to parameters that are adjusted for fuel consumption, fuel economy, torque requirements, engine emission standards, pollution control goals (e.g., NOx (nitrous oxide reduction), engine horsepower requirements, hydraulic system performance, electrical system power or current output, ambient environmental conditions (e.g., ambient temperature, humidity, ground elevation), or to meet other vehicle specifications. Payload data, configuration data, and calibration data are associated with a corresponding vehicle identifier for storage, retrieval or indexing in the remote data storage device 14.

In step S240, the vehicle electronics 46 receives the generated common payload or patch from the central electronic data processing system 10. For example, one or more controllers (73,74) within the vehicle electronics 46 may be reprogrammed with the common payload or patch from the central electronic data processing system 10. The vehicle electronics 46 or the controllers (73,74) may be reprogrammed to a state where the as-installed software matches a target configuration for the software on the vehicle electronics 46, or where performance of the vehicle electronics 46 or vehicle meets a vehicle specification. Calibration data, configuration data, or both may be established or optimized for particular environmental conditions, authorized vehicle features, or otherwise.

In step S242, the central data processing system 10 or the vehicle electronics 46, or both, may install the generated common payload or patch in the vehicle electronics 46. Step S242 may be carried out in accordance with various techniques that may be applied separately or cumulatively.

Under a first technique, the central data processing system 10 uses common payload processing software (e.g., 350 in FIG. 3) at the central data processing system 10, a local diagnostic computer 38, or both, where the same payload can be delivered remotely through remote programming of the vehicle electronics 46 (through communications with the vehicle wireless communication device 58) via a communications network 36 and wireless infrastructure 44 and locally through local programming via wireline or short-range wireless connection between a data port of the vehicle electronics and the local diagnostic computer 38.

Under a second technique, the central data processing system 10 uses common payload processing software (e.g., 350 in FIG. 3) to install or reprogram a payload, configuration data, calibration data, or components of configuration software for an engine controller 74 and a non-engine controller (e.g., 73) substantially simultaneously. Here, substantially simultaneously shall mean generally simultaneous, occurring at the same time plus or minus three seconds, occurring alternately on a time-division multiplexed manner, or occurring alternately during alternate time windows of equal or unequal duration.

Under a third technique, the central data processing system 10 uses common payload processing software (e.g., 350) to reprogram or install a payload, configuration data, calibration data, or components of configuration software into a first controller (e.g., 73 or 74) that is functioning properly and to ignore a second controller (e.g., 73 or 74), distinct from the first controller, that is malfunctioning or non-responsive to one or more data messages, or that is generating an error code or diagnostic code.

Under a fourth technique, the central data processing system 10 facilitates displaying a status of the programming the common payload or a patch to a user via a user interface 54 of the vehicle electronics 46 or a user interface 41 of a first service technician terminal 40 or a second service technician terminal 42.

Under a fifth technique, the central data processing system 10 facilitates allowing a user to control progress of the programming of the vehicle with the common payload or patch via a user interface 54 of the vehicle electronics 46 or a user interface 41 of a first service technician terminal 40 or a second service technician terminal 42.

Under a sixth technique, the central data processing system 10 may install the generated common payload in a manner that allows the central data processing system 10 to revert the vehicle electronics 46 to a previous programming state, upon a request generated by a technician or user from a first service technician terminal 40, the second service technician terminal 42, the user interface 54 of the vehicle electronics 46, or otherwise. For example, the central data processing system 10 may store prior payload data, prior configuration data, prior calibration data, current payload data, current configuration data, and current calibration data in a file, an archive file, an inverted file, a data record, a database or in another suitable data structure. Accordingly, the vehicle electronics 46, the data processing system 10, or the service technician (e.g., from a terminal 40, 42) may roll back the current configuration data, current payload, or current calibration of the vehicle electronics 46 or the vehicle to an earlier configuration or calibration, as available in the stored prior configuration data, the prior calibration data and the prior payload data.

In one example, the vehicle electronics 46, the central data processing system 10, or the user (e.g., via a local diagnostic computer 38 or the user interface 54 of the vehicle electronics 46) may trigger the rolling back of the current payload, current configuration or current calibration data to prior payload, prior configuration or prior calibration data. For instance, if the vehicle comprises a combine or a harvester, the vehicle electronics 46 in a prior configuration and prior calibration may be optimized for a first crop (e.g., corn), whereas the vehicle electronics 46 in a current configuration are optimized for a second crop (e.g., wheat or soybeans). Accordingly, the operator or vehicle electronics 46 may revert back to the prior configuration and prior calibration to match an operator's crop rotation cycle between the first crop and the second crop such that the vehicle electronics 46 is optimized for the particular corresponding crop that is current within the crop rotation cycle.

Figure 2C:
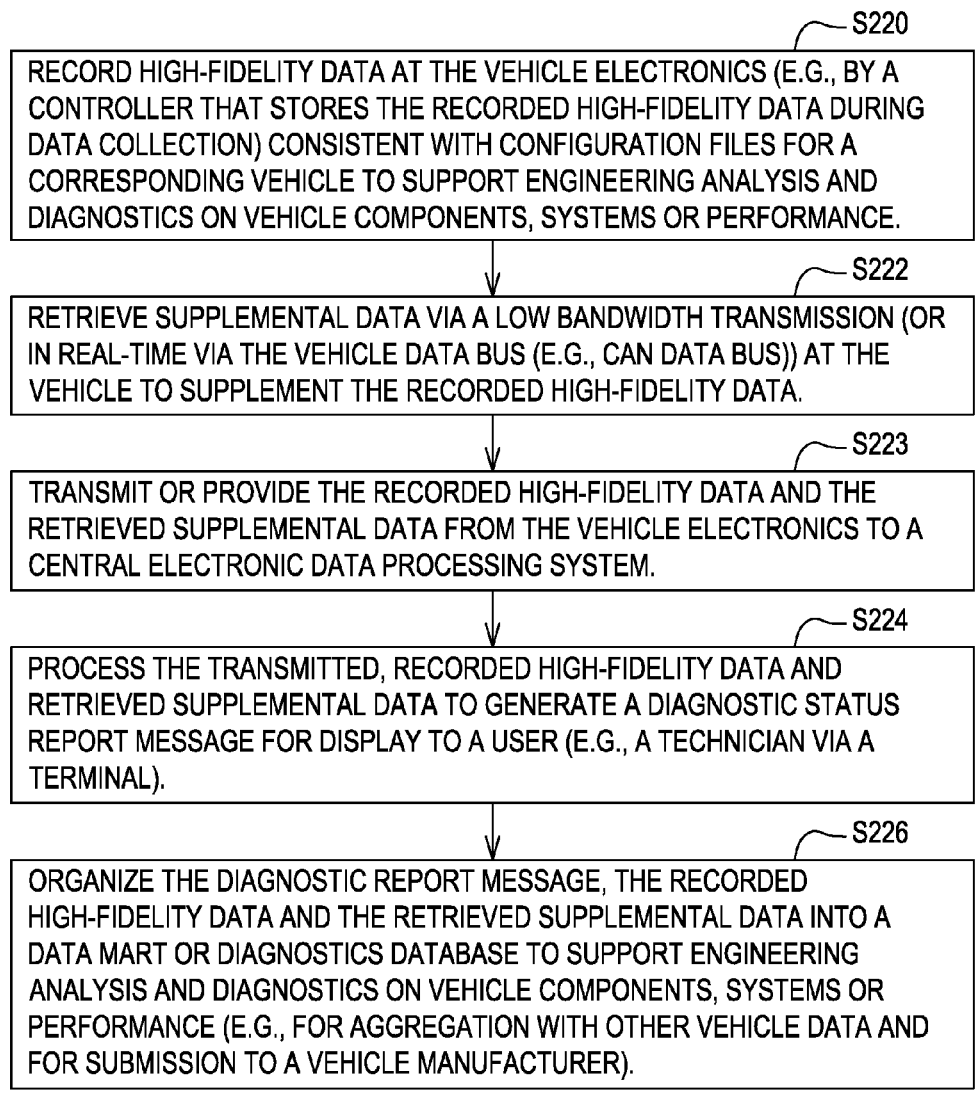
FIG. 2C is a flow chart of yet another embodiment of a method for performing diagnostics or software maintenance of vehicle electronics.

FIG. 2C relates to yet another embodiment of method of performing remote diagnostic on a vehicle. The method of FIG. 2C begins in step or block S300.

In step S220, the vehicle electronics 46 records high-fidelity data or higher sampling rate data at the vehicle consistent with configuration files 30 to support engineering analysis or diagnostics on vehicle components, systems or performance. High fidelity data may be defined in accordance with various definitions that may be applied alternately or cumulatively. Under a first definition, the term high-fidelity data is synonymous with higher sampling rate data with a sampling interval that is higher than total delay over a vehicle data bus 72 (e.g., CAN (controller area network) data bus), where total delay (e.g., approximately 0.5 microseconds or more) includes the sum of a propagation delay over the maximum length (e.g., 10 meters) of the vehicle data bus, a controller processing delay, and a controller transceiver delay.

Under a second definition, the high-fidelity data comprises higher sampling rate data that is gathered at higher than normal sample rates than those typically used by controllers (e.g., engine controller 74 or another controllers 73) during normal vehicle operation (or normal operation of a particular controller). A normal sampling rate means a sampling rate for data that is necessary or required for a controller (e.g. engine controller 74) to properly perform and function, aside from performing any diagnostic features or collecting data that is not necessary for the controller to properly perform and function. The higher sampling rate than a lower normal or typical sampling rate for a measured parameter may support improved accuracy or enhanced identification of a problem with a vehicle, a vehicle system or a component.

The high-fidelity data may be collected by an engine controller 74 or another controller (e.g., 73) that is associated with sensors or measurement devices, where the measured events (e.g., fuel injection or fuel metering system events) occur during time periods that are less than the total delay. The controller (e.g., 74) may store the collected high-fidelity data in buffer memory (e.g., external or internal to the controller) or in another data storage device (e.g., 56). The vehicle data bus 72 or controller area network (CAN) data bus may not have sufficient bandwidth or transmission rate capacity to transmit the high-fidelity data in real-time as it is collected. Instead, the collected high-fidelity data may be stored by and aggregated by a controller (e.g., 74) for later transmission over the vehicle data bus 72 and for subsequent analysis. For example, if the vehicle data bus 72 comprises a CAN data bus, the transmission rate may range from 1 megabits per second (Mbps) to 10 kilobits per second (Kbps). At a transmission rate of 10 kilobits per second, each symbol or bit may take up to 100 microseconds to transmit of the vehicle data bus 72 (e.g., CAN data bus) which can limit the real-time capabilities where the CAN data bus is heavily loaded with traffic or activity, for instance.

In step S222, the vehicle electronics 46 retrieves or records supplemental data via a low bandwidth transmission at the vehicle to supplement the recorded high-fidelity data. The low bandwidth transmission may be defined in accordance with several definitions that may be applied alternately or cumulatively. Under a first definition, the supplemental data is synonymous with the term lower sampling rate data that is collected at a lower sampling rate than the higher sampling rate of the high-fidelity data.

Under a second definition, the low bandwidth transmission comprises a wireless transmission between vehicle electronics 46 and the central electronic data processing system 10 or another remote data processing system, where the maximum bandwidth (or maximum transmission rate) is limited to meet or exceed a certain minimum threshold of reliability or signal quality or to comply with a bandwidth limitation provided by a satellite or other wireless service provider.

Under a third definition, the low bandwidth transmission is at a data transmission rate or maximum data transmission rate offered or provided by a vehicle data bus 72 (e.g., a CAN data bus), where it is understood that the maximum data transmission rate may be limited by loading of the vehicle data bus 72 with traffic, multiple controllers, actuators or other network devices. For example, in step S222 the vehicle electronics 46 may provide such low-bandwidth data to the central electronic data processing system 10 or the analyzer 26 after the vehicle electronics 46 has reported or transmitted pertinent high-fidelity data to the data processing system 10 or the analyzer 26. The vehicle electronics 46 may provide the low bandwidth transmission in real-time via the vehicle data bus 72 from the controller (e.g., 73 or 74) to supplement previously collected high-fidelity data.

In step S224, the data processing system 10 or the analyzer 26 process the recorded high-fidelity data and retrieved supplemental data to generate a diagnostic status report message for transmission to the first service technician terminal 40 or the second service technician terminal 42. In an alternate embodiment, for critical status of a failure, error, problem, or malfunction, or to prevent a failure (e.g., catastrophic failure) of the vehicle electronics 46 or the vehicle, the data processing system 10 or the analyzer 26 process the recorded high-fidelity data and retrieved supplemental data to generate a diagnostic status report message for transmission to a user interface 54 of the vehicle electronics 46 the first service technician terminal 40 or the second service technician terminal 42. Further, the diagnostic status report that is transmitted to the vehicle electronics 46 may instruct the user or operator of the vehicle to take corrective or precautionary measures with respect to the vehicle or the vehicle electronics 46.

In step S226, the data processing system 10 or the diagnostic database 28 organizes the diagnostic report message, the recorded high fidelity data and the retrieved supplemental data into a data mart or diagnostics database 28 to support engineering analysis and diagnostics on vehicle components, systems or performance.

Step S226 may be carried out in accordance with various techniques that may be applied alternately or cumulatively. Under a first technique, the data processing system 10 or the diagnostic database 28 organizes the diagnostic report message, the recorded high fidelity data and the retrieved supplemental data to identify trends in the diagnostic database 28. Under a second technique, the data processing system 10 determines a status or progress of diagnostic requests and displays the determined status to a user at a user terminal (40, 42) or user interface of the vehicle electronics 46 in communication with the central electronic data processing system 10. Under a third technique, the data processing system 10 displays real-time data readings from a vehicle to a user at a user terminal (40, 42) or user interface of the vehicle electronics 46 in communication with the central electronic data processing system 10.

Under a fourth technique, based on the diagnostic report message, the data processing system 10 and the user interface of the vehicle electronics 46 supports customer selection of a service center to remotely service a vehicle via settings selectable via web-site. The list of service centers presented to a particular user may be tailored (a) to have the closest geographic location between the service center and a corresponding particular user, or (b) to have experience or expertise in resolving one or more technical issues or problems identified by the diagnostic report message to the particular user.

Under a fifth technique, a billing system bills one or more users on a per use basis for remote diagnostic service and programming sessions that are selected by a user via the user interface of the vehicle electronics 46 or via a website accessed by the user through a personal communications device or computer.

An engine controller 74 or another controller (e.g., 73) may be equipped with an internal data monitor or another data collector (not shown) for collection of high-fidelity data. The internal data monitor may comprise an electronic module, a software module, or both. For example, the data collector may comprise the combination of electronic memory and a data processor 71. Similarly, the internal data monitor in controller (e.g., 73 or 74) may comprise a combination of electronic memory and a microprocessor or other data processor associated with the controller. The software module for the data collector or the internal data monitor comprises software instructions for reading, recording, storing, retrieving, and managing data in one or more registers, memory addresses or locations of the electronic memory consistent with recording instructions, recording parameters, sampling intervals, recording duration, or other instructions specified or selected by a user.

In one embodiment, high-fidelity data refers to data that is sampled at sampling rate that is greater than a real-time transmission rate or real-time data throughput rate of a vehicle data bus 72 (e.g., Controller area network data bus 72). High-fidelity data may also be referred to as higher sampling rate data, whereas low bandwidth transmission may be referred to as lower sampling rate data or vehicle data bus-limited or bandwidth-limited data. For example, high-fidelity data may refer to data that is sampled at a sampling rate that is greater than a real-time transmission rate that is operating under normal load conditions, a range of typical load conditions, or full load conditions, for a vehicle data bus 72. In one example, the sampling rate for the high fidelity data is less than or equal to 50 milliseconds. In another example, the sampling rate for high-fidelity data is less than or equal to 5 milliseconds. In yet another example, the sampling rate for high-fidelity data is less than or equal to 2.5 milliseconds.

High-fidelity data may be collected pertaining to one or more of the following parameters: (a) engine speed, (b) bus speed request valid, (c) desired fuel, (d) governor integral term, (e) governor proportional term, and (f) governor type. The high-fidelity data may be used to examine or evaluate the performance of one or more of the following components of a vehicle: fuel injection system, the fuel metering system, ignition timing, or other control aspects of a vehicle with an internal combustion engine, or a ground fault detection system for an electrically propelled vehicle, or an inverter or motor controller for controlling an electric drive motor for an electrically propelled vehicle.

The controller (73, 74) or vehicle electronics 46 may have data storage or electronic memory (e.g., external random access memory) that may be partitioned into one or more storage zones. The vehicle electronics 46 may record or monitor one or more parameters at one or more designed sampling rates or a default sampling rate. The vehicle electronics 46, the central data processing system 10 or the technician (via a terminal 40, 42) may set or select one or more of the following: (a) the parameters to be recorded, (b) the sampling rates, (c) a start trigger for starting recording, (d) a stop trigger for stopping recording, (e) memory allocation or data storage allocation, and (f) maximum recording duration or maximum size of recorded data. In accordance with one embodiment, one or more parameters can be recorded at the same time by one or more controllers (73,74). The method of FIG. 2C may be performed by running tests on the vehicle via a remote terminal (40, 42) in communication with at least one of the vehicle electronics 46 and the central electronic data processing system 10.

Figure 3:
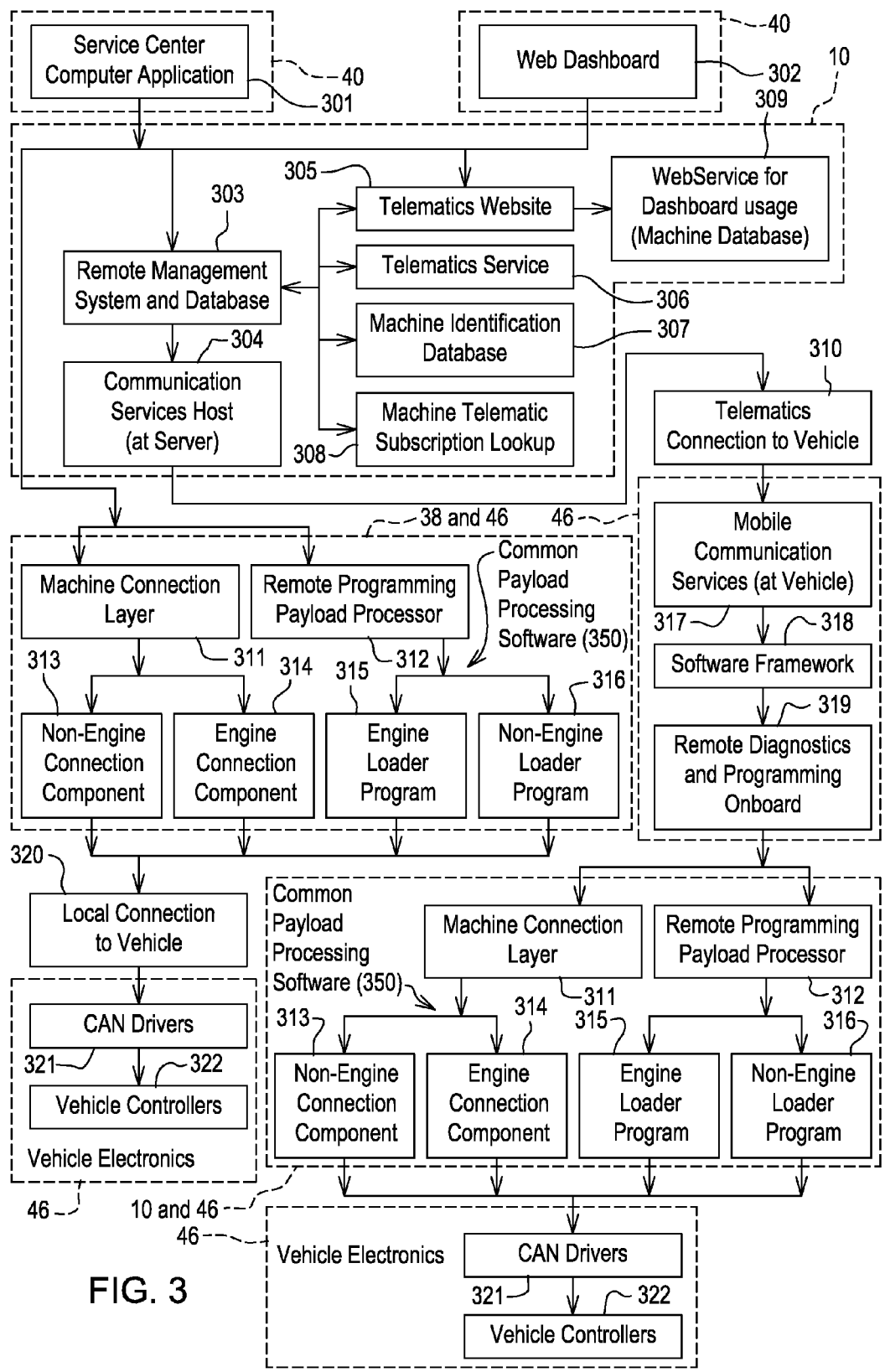
FIG. 3 is block diagram of software modules and components of the system for performing diagnostics or software maintenance, consistent with FIG. 1.

FIG. 3 illustrates one possible software configuration that supports the remote diagnostic system 11 of FIG. 1. Like reference numbers in FIG. 1 and FIG. 3 indicate like elements.

The service center computer application 301 and web dashboard 302, is configured to be executed on the central electronic data processing system 10 and displayed to a user of the first service technician terminal 40 or the second service technician terminal 42. The service center computer application 301 may encompass those software modules, data structures and files that are stored in the remote data storage device 14. The service center computer application 301 may facilitate a user's selection of a service center that is geographically closest to the vehicle or vehicle electronics 46 that requires analysis, diagnostics, repair, software programming, or software reprogramming.

The web dashboard 302 provides the status of upgrade requests, payload transfers, or diagnostic tests to a user interface 41 of a first service technician terminal 40 or a second service technician terminal 42. Web services for dashboard usage 309 supports provision of status data on payload transfer, reprogramming or other activities to the web dashboard, consistent with the technical limitations and specifications of the user interface 41 for the first service technician terminal 40, the second service technician terminal, or both.

The central electronic data processing system 10 executes or supports execution of following software modules, the following web site hosting and management functions, the following data storage and retrieval management functions, the following security and authorization functions, and other electronic data processing functions: the remote management system and database 303, the communications services host 304, the telematics website 305, the telematics service 306, the machine identification database 307, the machine telematic subscription lookup database 308, the webservice for dashboard usage 309 (machine database), and the telematics connection to vehicle 310.

The remote management system and database 303 may comprise the diagnostic database 28 of FIG. 1, for example. Communications service host 304 may be managed by or executed by the communications interface 18 of FIG. 1, for instance.

The machine identification database 307 can store authorization records for users (e.g., service technicians) and corresponding machine or vehicle identifiers that authorize the users to repair, reprogram, reconfigure, review, evaluate or diagnose corresponding vehicle electronics 46 or corresponding vehicles. The machine telematic subscription lookup 308 may relate to which technician terminals (e.g., first service technician terminal 40 or a second service technician terminal 42) are granted access for remote diagnostics or remote programming of vehicle electronics 46.

The machine connection layer 311 and the remote programming payload processor 312 are common payload software components 350 that can be used for both local and remote programming and analysis of the vehicle electronics 46. Local programming is programming and analysis is done through the local diagnostic computer 38 that is connected directly to the vehicle electronics 46 or its data port 48 through a wire, cable, or wireless link. The common payload processing software is common or generally the same for the central electronic data processing system 10 and the local diagnostic computer 38. The central electronic data processing system 10 provides payloads or reprogramming remotely via the communications network 36 and the wireless infrastructure 44 to the vehicle electronics 46. The local diagnostic computer 38 provides payloads and reprogramming directly to the vehicle electronics 46 via local connection. The local diagnostic computer 38 may download programming from the central electronic data processing system 10 via a communications network 36 or otherwise.

The common payload processing software comprises an engine connection component 314, an engine loader program 315, a non-engine connection component 313, and a non-engine loader program 316. Accordingly, the software or payload can be tailored to the different types of engine and non-engine controllers (73,74). Further, the software features redundancy such that (1) reprogramming of non-engine controllers (e.g., 73) and engine controllers (e.g., 74) can be done simultaneously, and (2) reprogramming of a non-engine controller (e.g., 73) can still be done, if an engine controller (e.g., 74) or software reprogramming software produces a fault or error and cannot be reprogrammed, and (3) reprogramming of an engine controller (e.g., 74) can still be done, if a non-engine controller (e.g., 73) or software products a fault or error and cannot be reprogrammed.

In one embodiment, during reprogramming all other functions of the controller other than programming or writing to its memory may be disabled.

In another illustrative embodiment, the common payload software may use an environment variable. The environment variable provides an indicator as to whether the vehicle electronics 46 are operating in a local reprogramming environment or in a remote reprogramming environment. The vehicle electronics 46, the central data processing system 10 or both determine whether an environment variable is present that indicates a remote programming environment. If the remote programming environment is detected, the central data processing system 10 may suppress certain elements of a script based on the display capabilities of a user interface 41 at the vehicle electronics 46 or to filter the displayed content to eliminate technician content or technical content that is not deemed to be suitable for a end user of a vehicle, as opposed to a sophisticated technician (e.g., or the user interface 41 of the first service technician terminal 40 or the second service technician terminal 43).

In an alternative embodiment, in the remote programming environment, the script may be modified to request machine features such as tire size or other information that may be use to reprogram the machine.

The vehicle electronics 46 may facilitate execution of mobile communication services 317, a software framework 318, remote diagnostics and programming onboard 319, telematics connection 310 to the vehicle, local connection 320 to the vehicle, controller area network (CAN) drivers 321 and vehicle controllers 322. The CAN drivers 321 is software that allows one or more controllers (73, 74) to interact with other network elements or to communicate over the vehicle data bus (e.g., CAN data bus), where network elements may comprise one or more controllers, transceivers, actuators, sensors, or other electronic devices. Vehicle controllers 322 may comprise engine controller 74 and controller 73, for instance.

Figure 4:
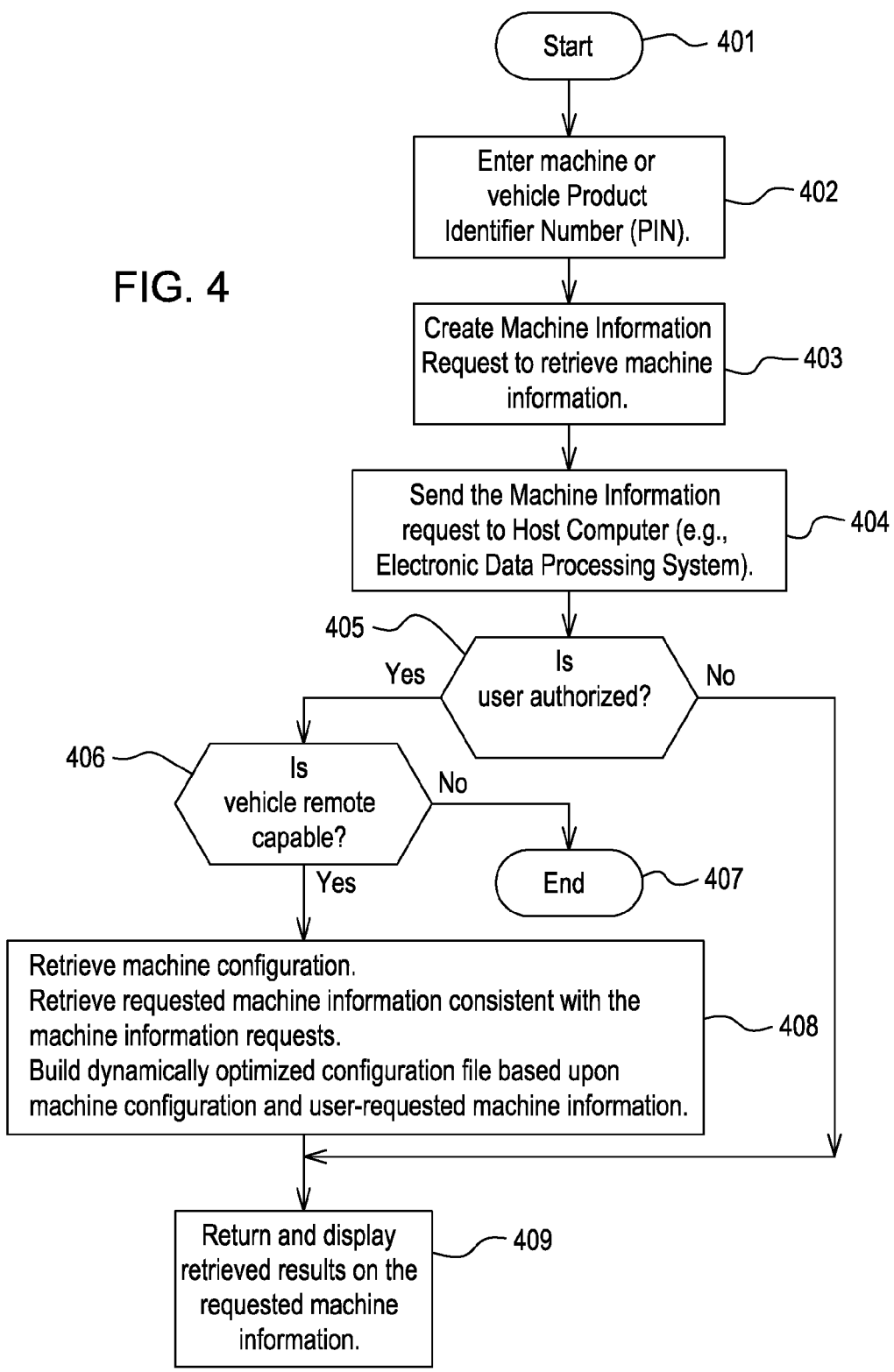
FIG. 4 is a flow chart of a process for retrieving machine configuration workflow.

The process of FIG. 4 begins or starts in step or block 401.

In step 402, the user or technician enters a machine product identifier (e.g., a vehicle identifier) into a terminal (e.g., a first service technician terminal 40) or another computer device that is capable of wireline or wireless communications with the central electronic data processing system 10 via the communications network 36 (e.g., Internet).

In step 403, via the terminal or the computer device, a user or technician creates a request to retrieve machine information (e.g., configuration data, calibration data, as-loaded software data, target software data, or other data relating to the vehicle electronics 46 or controllers therein) from the central electronic data processing system 10 or a database accessible via the central electronic data processing system 10.

In step 404, via the terminal or the computer device, the user or technician sends the created request to retrieve machine information to the central electronic data processing system 10 (e.g., host computer) via the communications network 36 (e.g., Internet).

In step 405, the central electronic data processing system 10 determines whether or not the user is authorized. For example, the central electronic data processing system 10 may determine the user is authorized if the user or technician passes an authentication process, such as entry of an identifier and a corresponding password. If the user is authorized, the method continues with step 406. However, if the user is not authorized (e.g., in accordance with an authentication process or security measure), the method continues with block 409.

In step 406, the central data processing system 10 determines whether the particular vehicle or machine, or its associated vehicle electronics 46, are remote capable. Remote capable means that the vehicle electronics 46 supports wireless communications between the central electronic data processing system 10 and the vehicle electronics 46 via the communications network 36 and via any other intermediary (e.g., wireless infrastructure 44). If the vehicle or vehicle electronics 46 are remote capable, the method continues with step 408. However, if the vehicle or vehicle electronics 46 is not remote capable, the method continues with block 407.

In step 408, the central data processing system 10 completes one or more of the following acts: (a) the central data processing system 10 retrieves a machine configuration or configuration data for the vehicle in accordance with the entered machine product identifier number and the information request, (b) the central data processing system 10 retrieves the machine request information, (c) the central data processing system 10 builds a dynamically optimized configuration file based upon the machine configuration and user requested information.

In step 409, the central data processing system 10 returns and displays results from the retrieval of machine information.

Figure 5:
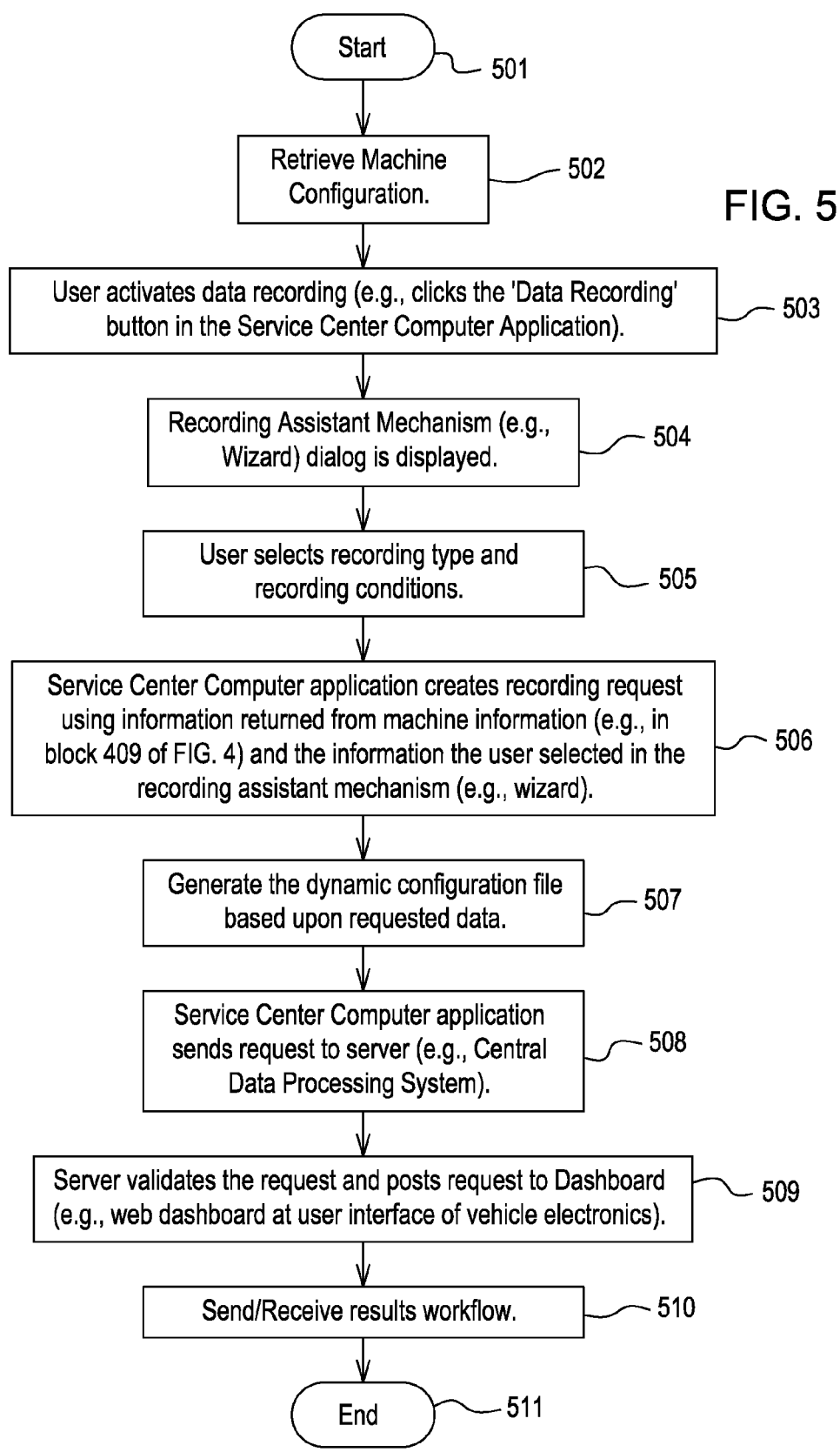
FIG. 5 is a flow chart of a process for managing data recording requests to facilitate diagnostics or evaluation of performance of the vehicle or vehicle electronics.

FIG. 5 is a flow chart of a process for a data recording process of data on the vehicle electronics 46. The method of FIG. 5 begins in step or block 501.

In block 502, a central electronic data processing system 10 retrieves a machine configuration for a user or technician (e.g., at a first service technician terminal 40, a second service technician terminal 42, or another terminal capable of communicating with the central electronic data processing system 10 via the communications network 36 or otherwise).

In block 503, a user (via a user interface 41 of a terminal) activates, enters or selects a data recording feature (e.g., a data recording button), switch, or control. The user interface 41 may present the data recording feature in the service center computer application 301, or otherwise.

In block 504, the central data processing system 10 or the terminal displays a data recording assistant. The data recording assistant comprises a wizard, a menu-driven set of instructions, or another software-assisted mechanism for recording parameters of the vehicle electronics 46, or one or more controllers of the vehicle electronics 46.

In block 505, the central data processing system 10 selects or enters one or more of the following: recording type, recording parameters, recording conditions, recording duration, recording triggering event, recording start time, recording stop time, or other recording-related user-definable elements.

In block 506, the central data processing system 10 or the service center computer application 301 creates recording request using information returned from retrieved machine information and the information the user selected or entered in the recording assistant in block 504, block 505, or both.

In block 507, the central data processing system 10 generates the dynamic configuration file based upon the requested data or the recording request.

In block 508, the service center computer application 301 sends a request to server (e.g. central data processing system 10). The server or central data processing system 10 forwards or transmits the requested data or the recording request to the vehicle electronics 46 for processing. The vehicle electronics 46 may process the request by a controller, an engine controller, or a recorder 60 in conjunction with a data processor.

In block 509, the central data processing system 10 or the server validates the request and posts a request to the dashboard.

In block 510, the send/receive results workflow. The vehicle electronics 46 collects data in a data collector, recorder 60, controller or an engine controller. The collected data is gathered in accordance with the recording parameters and recording conditions selected in block 505. Once the collected data is complete in accordance with the request, the vehicle electronics 46 transmits or sends the results workflow (e.g., recorded data or collected data) to the central electronic data processing system 10 for analysis by an analyzer 26, storing in a diagnostic database 28, or other appropriate measures.

In block 511, the process of FIG. 5 ends.

Figure 6:
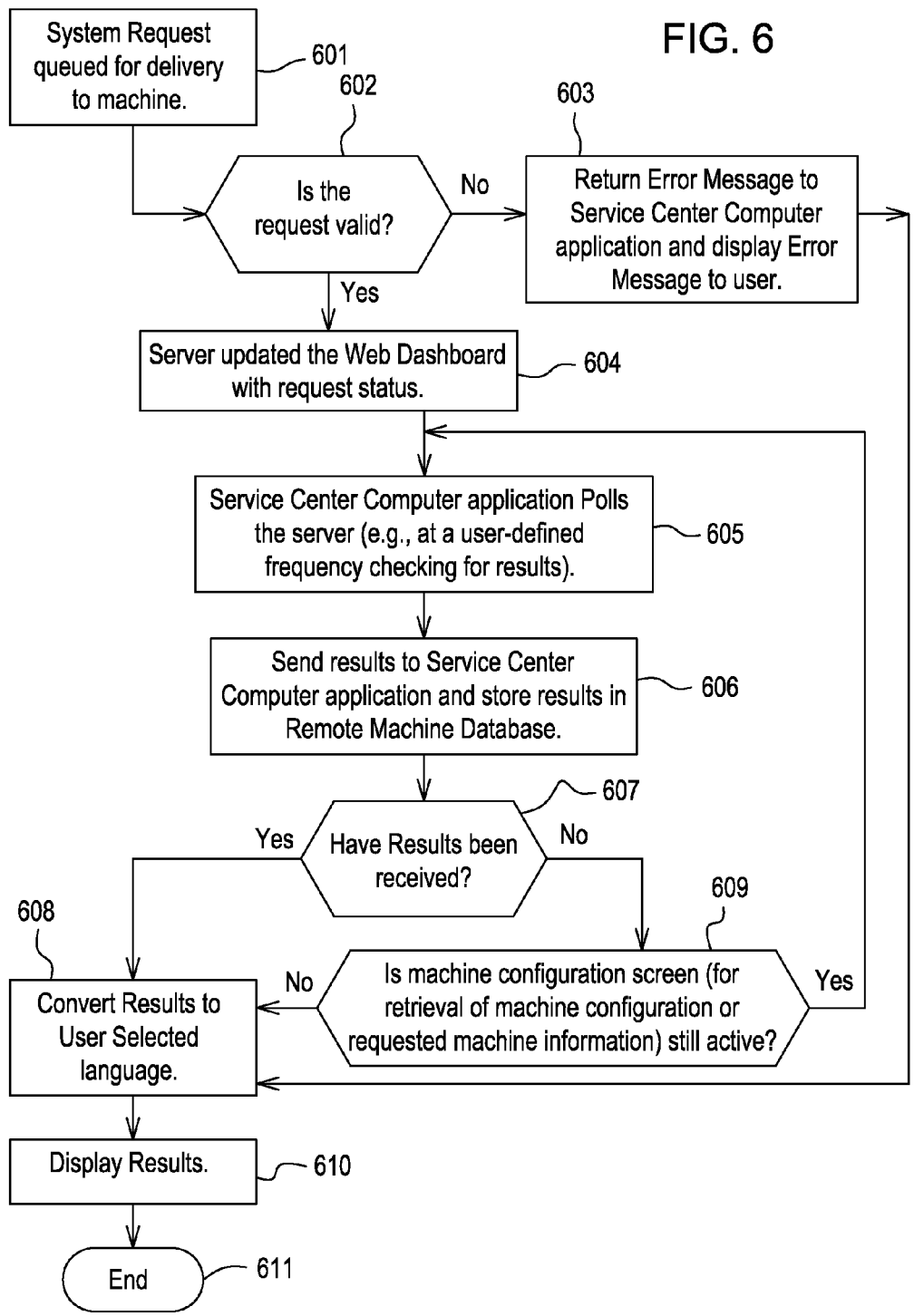
FIG. 6 is a flow chart of a process for managing a user selected language.

FIG. 6 is a flow chart of a process for managing requests and results workflow. The method of FIG. 6 begins in block 602.

In block 601, central data processing system 10 queues a request for delivery to a machine. For example, the central data processing system 10 may receive the request from a first service technician terminal 40, a second service technician terminal 42, and another terminal.

In block 602, the central data processing system 10 determines whether or not a received request is valid. The received request may be validated by an authentication process in which one or more of the following is verified: (a) user identifier and corresponding user password, (b) vehicle identifier and authorization of a particular user associated with the user identifier to modify or receive information about vehicle configuration of a corresponding vehicle, (c) format of the request is in the proper syntax, and (d) requested information is available for the particular vehicle with the corresponding set of features or vehicle configuration. If a request is valid, the method continues with step 604. However, if the request is not valid, the method continues with step 603.

In block 603, the central data processing system 10 returns an error (e.g., error message) to the service center computer application 301 and displays the error or error message to a user via a user terminal or a user interface 41. The error message may explain or relate to statement on why the received request was not valid. The error message may explain one or more of the following: (a) user identifier or user password is incorrect, (b) particular user associated with the user identifier is not authorized to modify or receive information about vehicle configuration of a corresponding vehicle, (c) format of the request is not in the proper syntax, and (d) requested information is not available for the particular vehicle with the corresponding set of features or vehicle configuration.

In block 605, the first service technician terminal 40, the second service technician terminal 42, or a service center computer application 301 therein communicates with (e.g., polls) the central data processing system 10 (e.g., server) at a user-defined frequency or interval to check for results.

In block 604, the central data processing system 10 (e.g., server) updates or refreshes the screen or state of the user interface 41 of the first service technician terminal 40, the second service technician terminal 42, or the service center computer application 301 with the web dashboard 302 with a request status.

In block 606, central data processing system 10 (e.g., server) sends the results to the first service technician terminal 40, the second service technician terminal 42, or the service center computer application 301 and the results are stored in the remote data storage device 14 or in the remote machine database associated with the central data processing system 10.

In block 607, the central data processing system 10, the first service technician terminal 40, the second service technician terminal 42, or all of the foregoing system elements, determines whether or not the results were received or have been received. If the results were received, the method continues with step 608 and step 610. However, if the results were not received, the method continues with step 609.

In step 608, the central data processing system 10, the first service technician terminal 40, the second service technician terminal 42, or any combination of the foregoing network elements, converts results to user selected language for display via a user interface 41.

In step 610, the user interface 41 of the first technician terminal, the second service technician terminal 42, or the local diagnostic computer 38 displays the results.

In step 611, the process ends.

Figure 7:
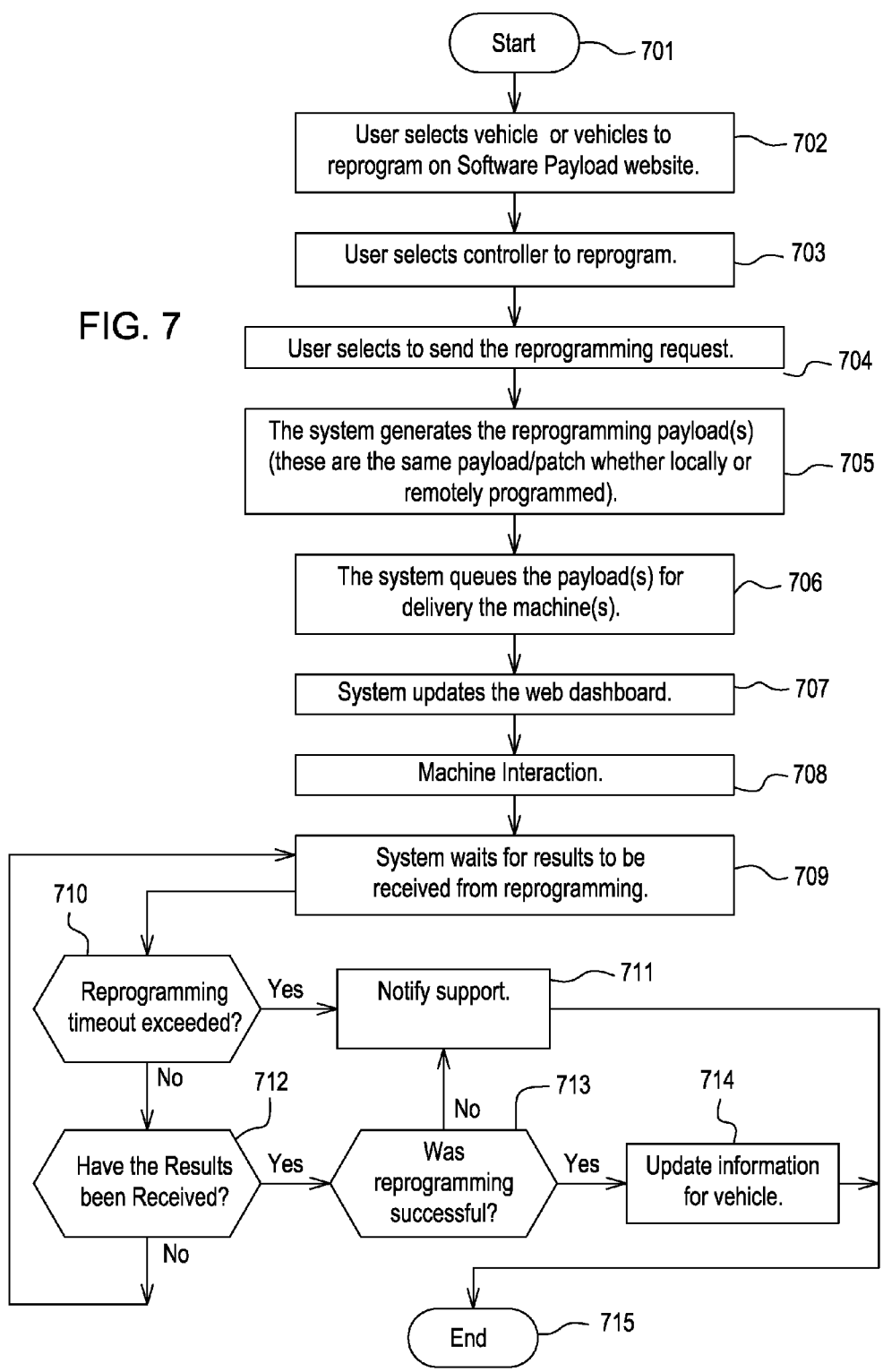
FIG. 7 is a flow chart of a process for reprogramming of the vehicle electronics.

The process of FIG. 7 relates to updating of configuration data or other vehicle software data after successful installation of software in the vehicle electronics 46. The method of FIG. 7 begins in block 701.

In block 702, via a user interface 41 of the first service technician terminal 40 or the second service technician terminal 42, the user or service technician selects a vehicle or vehicles to reprogram on the software payload website. The software payload website may be provided through or hosted on the central electronic data processing system 10.

In block 703, via a user interface 41 of the first service technician terminal 40 or the second service technician terminal 42, the user selects a particular controller associated with or in the vehicle electronics 46 to reprogram.

In block 704, via a user interface 41 of the first service technician terminal 40 or the second service technician terminal 42, the user selects or makes an entry in the user interface 41 to send the reprogramming request.

In block 705, the central data processing system 10 generates the reprogramming payload(s), if the user is authorized to reprogram a respective vehicle with the vehicle electronics 46 and particular controller. The payloads are generated as previously described in this document. The same payloads may be used whether the vehicle electronics 46 or controller is locally or remotely programmed.

In block 706, the central data processing system 10 queues the payload(s) for delivery to the machine(s) or to the vehicle electronics 46. The central data processing system 10 is capable of sending one or more payloads that are queued in its data storage device via the communications network 36 and the wireless infrastructure 44 to the vehicle electronics 46.

In block 707, the data processing system 10 updates the web dashboard 302 that is displayable to the first service technician terminal 40, the second service technician terminal 42, or both. The web dashboard 302 can be displayed on the user interface 41 of the terminal to provide a current status of the downloading or installation of one or more payloads in the vehicle electronics 46 or a particular controller of the vehicle electronics 46.

In block 708, the machine interaction occurs, where one or more payloads are transmitted from the data processing system 10 or its data storage device via the communications network 36 and the wireless infrastructure 44 to the vehicle electronics 46.

In block 708, the data processing system 10 waits for the results (e.g., return file or acknowledgement) to be received from the vehicle electronics 46 or particular controller that was reprogrammed or attempted to be reprogrammed. The results, return file or acknowledgment provides an indication as to whether the reprogramming was successful or not, or other associated indicators (e.g., fault codes, diagnostic codes, or diagnostic messages) of the state of the vehicle electronics 46 or a particular controller.

In block 710, the central data processing system 10 determines if the reprogramming was executed without the triggering of a timeout exceeded. If the reprogramming timeout was exceeded, a support mailbox or a support process is notified. However, if the reprogramming timeout was not exceeded, the method continues with step 712.

In step 712, the central data processing system 10 determines if the results were received. If the results were received the method continues with step 713. However, if the results were not received, the method continues with step 709.

In step 713, the central data processing system 10 determines whether or not the reprogramming was successful. The data processing system 10 may read the results, return file or acknowledgement transmitted by the vehicle electronics 46 via the wireless infrastructure 44 and the communications network 36 to the central data processing system 10. The data processing system 10 interprets or reads the results, return file or acknowledgement to determine whether or not the reprogramming was successful. If the reprogramming was successful, the method continues with step 714. However, if the reprogramming was not successful, the method continues with step 711. The method ends in step 715 after step 711 or 714.

Figure 8A:
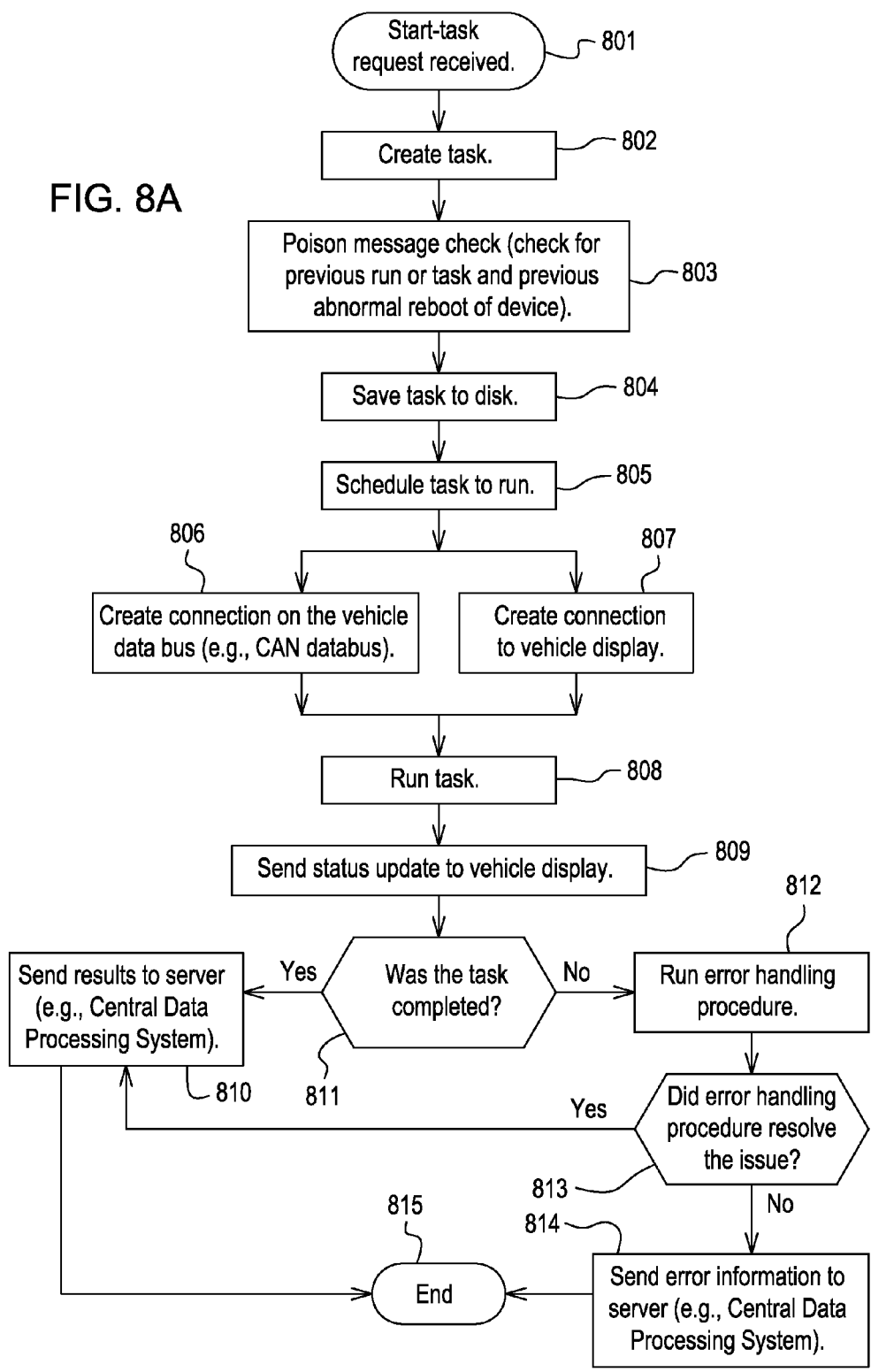
FIG. 8A is a flow chart of process for handling errors after application of a task, payload or update to the vehicle electronics.

The process of FIG. 8A relates to error handling in the updating of software in the vehicle electronics 46. The process of FIG. 8A begins in step 801.

In step 801, a central data processing system 10 receives a start task request from a first service technician terminal 40 or a second service technician terminal 42.

In step 802, the central data processing system 10 creates a task based on the start task request if the user is authorized to run the task for a particular machine, vehicle or associated vehicle electronics 46.

In step 803, a central data processing system 10 checks to determine whether the task or task request relates to a poison message. For example, the central data processing system 10 checks for a previous run or task and previous abnormal reboot of a device, or the data processing system 10.

In step 804, the central data processing system 10 saves the task to a data storage device, such as a magnetic disk, an optical disk, a disk drive, or electronic memory (e.g., non-volatile random access memory).

In step 805, the central data processing system 10 schedules the task to run.

In block 806, the central data processing system 10 creates a connection on the vehicle data bus 16 (e.g., Controller Area Network (CAN) data bus 16).

Block 807 may be executed simultaneously with block 806, or after or before block 806. In block 807, the central data processing system 10 creates a connection to a vehicle display or user interface 41 in the vehicle electronics 46. The connection may comprise a communications channel or packet-based communication established between the data processing system 10 and the vehicle electronics 46 via the communications network 36 and the wireless infrastructure 44.

In block 808, the central data processing system 10, the vehicle electronics 46 or both run the task.

In block 809, the central data processing system 10 and the vehicle electronics 46 send a status update to the vehicle display or user interface 41.

In block 811, the central data processing system 10, the vehicle electronics 46, or both determine if the task was completed successfully. If the task was completed, the method continues with step 810. However, if the task was not completed an error handling procedure is run in block 812.

In block 810, the vehicle electronics 46 sends the results to the central data processing system 10.

After step 812, the method continues with step 813. In step 813, the vehicle electronics 46, the data processing system 10, or both determine if the error handling procedure resolved the issue. If the error handling procedure resolved the issue, the method continues with block 810. However, if the error handling procedure did not resolve the issue, the method continues with block 814.

In block 814, the vehicle electronics 46 sends error information to the central data processing system 10 for analysis.

In block 815, which may follow block 810 or block 814, the process of FIG. 8A ends.

Figure 8B:
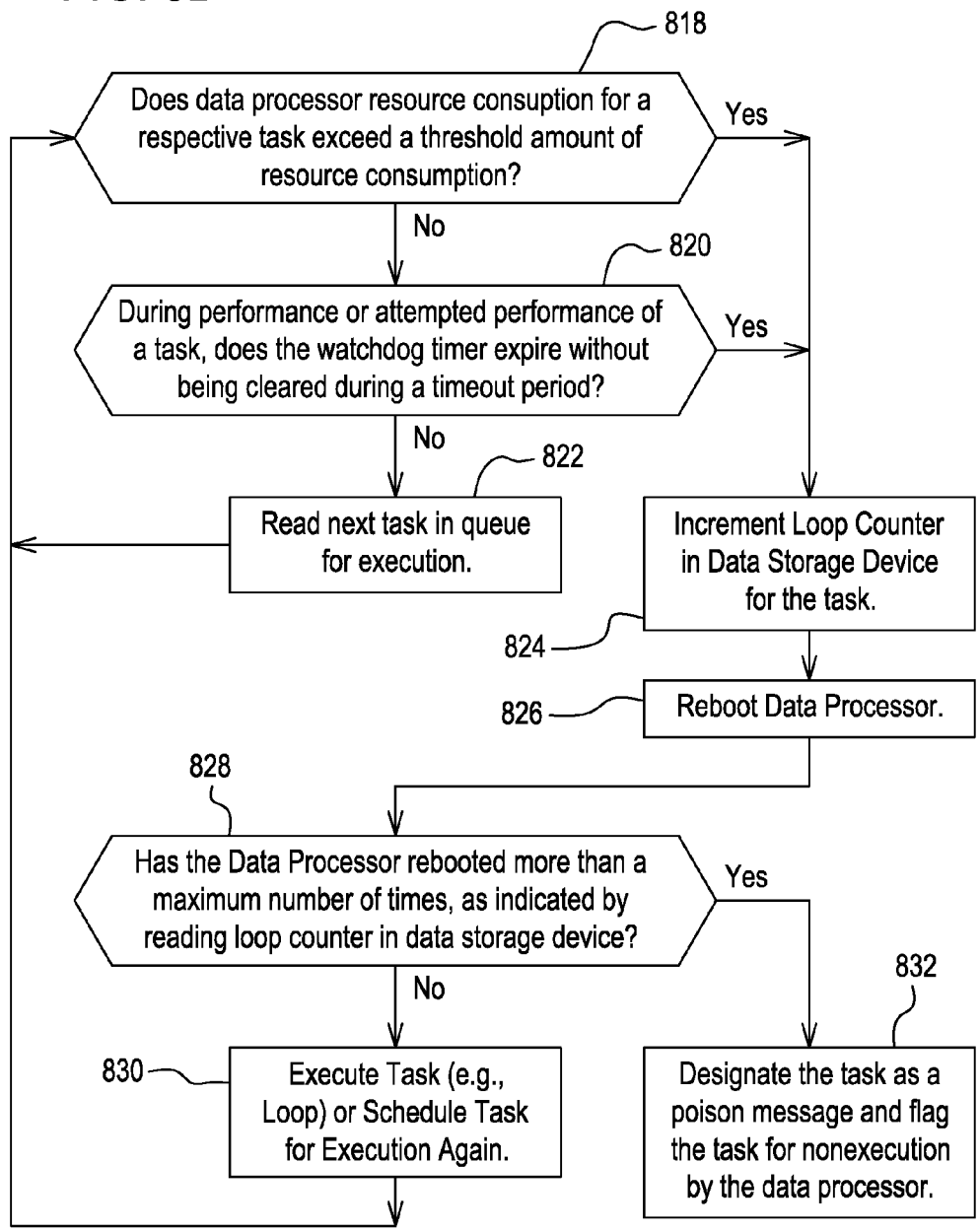
FIG. 8B is a flow chart of process for detecting and managing poison messages or tasks.

The process of FIG. 8B relates to detecting and managing of poison messages or tasks in the software in the vehicle electronics 46. The process of FIG. 8B begins in step 818. The process of FIG. 8B provides an illustrative example of step 803 in FIG. 8A, for example. Like reference numbers in FIG. 8A and FIG. 8B indicate like elements.

Prior to executing step 818, the data processor 71 or vehicle electronics 46 executes or performs a particular task. For example, the data processor 71 may perform or run the particular task in block 808 of FIG. 8A. A task refers to any discrete, identifiable process, procedure or series of processes and procedures that are applied to input data, output data, intermediate data derived from the input data, or a precursor to the output data by the data processor 71. In one example, a task may include trigger-based recording of the performance of or diagnostic data associated with a controller 73 or an engine controller 74. In another example, a task comprises recording data at the vehicle electronics 46 to support engineering analysis or diagnostics on vehicle components, systems or performance.

In step 818, the resource monitor 74, poison task module 65 or the data processor 71 determines if the data processor resource consumption (e.g., of vehicle data processor 71) for a respective task exceeds a threshold amount of resource consumption. The threshold amount of resource consumption may relate to one or more of the following: (1) a measure of the processing throughput of the data processor 71 (e.g., in total processing time duration, or in Megabytes or Gigabytes processed per second during the total processing time duration) consumed for performance of a corresponding particular task, (2) measuring of the processing capacity of the data processor 71 (e.g., in total processing time duration, or in Megabytes or Gigabytes processed per second during the total processing time duration) consumed for performance of a corresponding particular task, and (3) measuring the percentage of total processing capacity consumed for performance of a corresponding particular task, where the threshold amount of resource consumption indicates a higher than mean historic consumption or higher than median historic consumption of the processing throughput of the data processor 71 or the processing capacity of the data processor 71 for a corresponding task or a substantially similar task.

The resource monitor 74 is capable of estimating the data processing resource consumption for each respective task performed by the data processor 71 or the percentage of total processing capacity consumption for each respective task. A task refers to any discrete, identifiable process, procedure or series of processes and procedures that are applied to input data, output data, intermediate data derived from the input data, or a precursor to the output data by the data processor 71. For example, a task may include trigger-based recording of the performance of or diagnostic data associated with a controller 73 or an engine controller 74.

If the data processor resource consumption for a respective task exceeds a threshold amount of resource consumption, the method continues with step 824. However, if the data processor resource consumption for a respective task equals or does not exceed the threshold amount of resource consumption, the method continues with step 820.

In step 820, during the performance or the attempted performance of a respective particular task, the watchdog timer 73 determines if the watchdog timer 73 expires without being cleared during a timeout interval. The watchdog timer 73 may track the performance of a particular task or group of tasks that should normally be performed or processed during the timeout interval. If the watchdog timer 73 expires without being cleared during the timeout interval (e.g., watchdog timeout period), the method continues with step 824, where reset logic 73 may reset or reboot the data processor 71, as later described in block 826. However, if the watchdog timer 73 does not expire without being cleared during the timeout interval (e.g., watchdog timeout period), the method continues with step 822.

In step 822, the data processor 71 reads the next task in queue for execution. The task may be arranged as a series of machine level instructions in a data stack or in data registers associated with the data processor 71, its arithmetic logic unit, electronic data storage, or another component with data that is readable by the data processor 71. After step 822, the method returns to or continues with step 818. In 822, the data processor 71 may optionally wait a time interval prior to returning to step 818, or delay such execution in accordance with interrupt procedures coordinated by the data processor 71.

In step 824, which may follow step 820, the data processor 71 or loop counter 75 increments the loop counter 75 in the data storage device for the corresponding particular task. Step 824 may be executed in accordance with various techniques, which may be applied alternatively or cumulatively. Under a first technique, the loop counter 75 in a vehicle data storage device 56 is incremented if the resource consumption (in block 818) exceeds the threshold amount. Under a second technique, the loop counter 75 in the vehicle data storage device 56 is incremented if the watchdog timer expires 72 without being cleared during the timeout period or timeout interval.

Under a third technique, a unique loop counter 75 may be allocated or assigned to each corresponding particular task for tracking purposes. The loop counter value for each corresponding particular task is stored in the vehicle data storage device 56 (e.g., in the loop counter 75) in a manner that allows for the loop counter value to be preserved or retained when the data processor 71 is rebooted or reset. For example, the vehicle data storage device 56 may comprise non-volatile electronic random access memory, an optical storage device, a magnetic storage device, or a magnetic disk drive that retains loop counter values or other data in the loop counter 75 when the data processor 71 is turned off, reset or rebooted.

In step 826, the reset logic 73, the watchdog timer 72 or the poison task module 65 resets or reboots the data processor 71. The data processor 71 or vehicle electronics 46 may be rebooted or reset in one or more of the following circumstances: (1) the data processor 71 is rebooted or reset if the watchdog timer expires without being cleared during the timeout period or timeout interval, or (2) the data processor 71 is rebooted or reset if the resource consumption for the respective particular task exceeds the threshold amount. For example, where the watchdog timer 72 expires without resetting or clearing a triggering value stored in a data register during the watchdog timeout period, the watchdog timer 71 and the reset logic 73 generate a reset or reboot signal for the data processor 71 to reset or reboot the data processor 71.

Step 828 follows step 826. In step 826, the data processor 71, poison task module 65, or the loop counter 75 determines if the data processor 71 is rebooted or reset more than a maximum number of times (e.g., three times or in accordance with technician-definable setting of the maximum number of times), as indicated by reading a loop counter 75 in the data storage device 56. If the data processor 71 is rebooted or reset more than a maximum number of times (e.g., three times or in accordance with technician-definable setting of the maximum number of times), the method continues with block 832. However, if the data processor 71 is not rebooted or reset more than a maximum number of times, the method continues with block 830.

In block 830, the data processor 71 may execute the loop associated with the task again or may reschedule the task for execution by the data processor 71, prior to returning to step 818. For instance, the data processor 71 or vehicle electronics 46 executes the particular task again after rebooting or resetting the data processor 71, if the data processor 71 or vehicle electronics 46 has not rebooted or reset more than a maximum number of times (e.g., defined by a technician).

In block 832, the data processor 71 or the poison task module 65 identifies or designates the task as a poison message and flags the task for non-execution by the data processor 71. The particular task is designated as a poison message by the data processor 71 or the poison task module 65 if the data processor 71 has been rebooted or reset a maximum number of times as indicated by the loop counter 75. Block 832 may be executed in accordance with various techniques that may be applied cumulatively or separately. Under a first technique, the data processor 71 or poison task module 65 may segregate or isolate the poison message in the data storage in a section of data storage device 56 that is prohibited from read access or write access by one or more executable programs, or the poison task module 65 or the data processor segregates or isolates the poison message in the data storage device 56 (e.g., in accordance with a security or operating system algorithm) to prevent reading or writing to one or more application programs.

Under a second technique, the data processor 71 or poison task module 65 may elect to delete the files or data records or file fragments associated with the poison message or poison task, either after segregation for some time period or in lieu of segregation.

Under a third technique, the data processor 71 is relieved of processing of poison data messages that consume greater than target levels of processing resources to enhance processing efficiency and throughput. The data processor 71 is better able to perform other critical tasks in real-time, where such critical tasks may comprise one or more of the following: collection or processing of high-fidelity data; collection or processing of diagnostic data; reprogramming of one or more controllers (73, 74), or vehicle electronics 46; reconfiguring or recalibration of one or more controllers (73,74), or vehicle electronics 46; control of internal combustion engine settings for economy or power; control of fuel metering settings; control of pollution or emission controls; vehicle location determination; determination of vehicle position, tilt, roll and yaw; vehicle navigation; vehicle safeguarding; obstacle detection; obstacle avoidance; steering, braking or controlling the vehicle to avoid collisions with obstacles or striking obstacles; and detecting, sensing perceiving or scanning an area or environment around the vehicle with visual, audio, infra-red, laser, near-infrared, stereo vision or other devices.

Under a fourth technique, the data processor 71 or the poison task module 65 saves or stores the fact that it ran a particular task, but did not complete the particular task to the poison task module 65 or the data storage device 56. The poison task module 65 may contain a task processing queue to assure that the identity of poison tasks are not lost across power cycles, resetting or rebooting of the data processor 71 or the vehicle electronics 46. The data processor 71 or the poison task module 65 reads a particular task in the task processing queue at start up and before running the particular task to determine whether or not the task qualifies as a poison task or contains a poison message. If the poison task module 65 indicates that a task is a poison task, the data processor 71 will not run the task and the data processor 71 will send back a poison task status to the central electronic data processing system 10 (e.g., poison status message for display on a web dashboard), the user interface 41 of the first service technician terminal 40, or the user interface 41 of the second service technician terminal 42 via the communications network 36. The poison task status will inform the service technician that the particular task was not executed, that software was not installed in the vehicle electronics 46 or the controllers (73, 74), a calibration process of the vehicle electronics 46 could not be performed, or that a diagnostic process could not be performed because of a poison message in the software.

Figure 9:
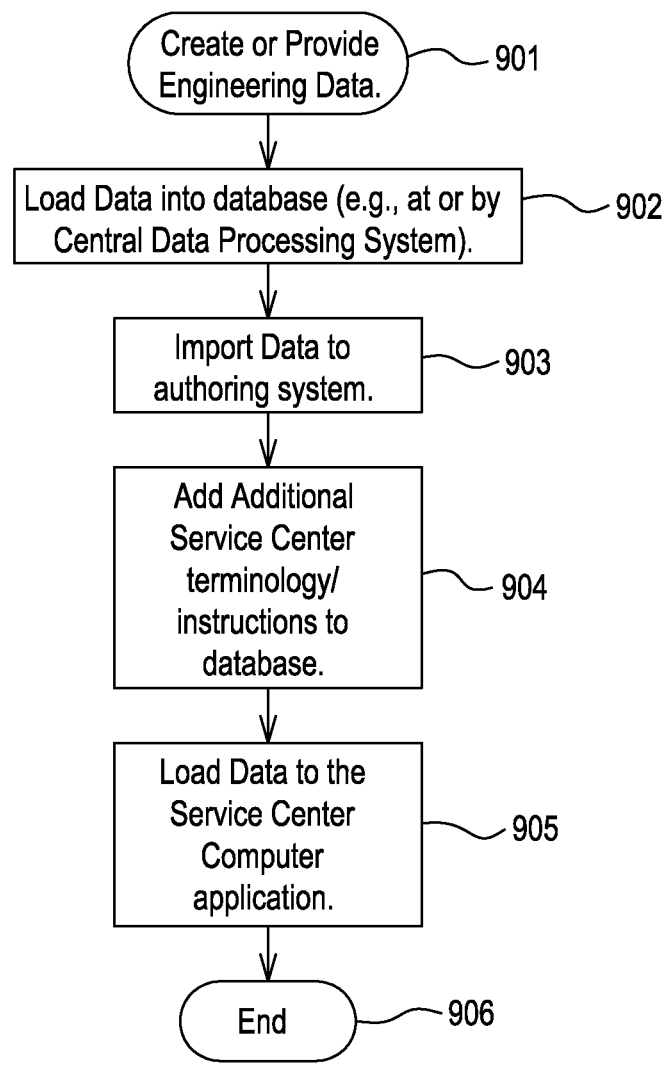
FIG. 9 is a flow chart of a process for importing engineering configurations for the vehicle or vehicle electronics into the central data processing system.

The method of FIG. 9 relates to handling or importing of engineering data into the diagnostic system. The method begins in block 901.

In block 901, engineering data is created.

In block 902, the created engineering data is loaded into or entered in the central data processing system 10. For example, a user enters the created engineering data into the central data processing system 10 via a user interface 41 associated with a first service technician terminal 40, a second service technician terminal 42, or another terminal.

In block 903, the central data processing system 10 imports the engineering data into an authoring system.

In block 904, the central data processing system 10 adds additional terminology, instructions or other supplemental data to the imported engineering data via the authoring system. The supplemental data supports the service center computer application 301, which can be displayed by a user on user interface 41 of a terminal.

In block 905, the central data processing system 10 loads the engineering data and supplemental data to the service center computer application 301.

In block 906, the method of FIG. 9 ends.

FIG. 10 provides an illustrative example of a billing system. The billing system may be implemented by the remote data processor 12 as software instructions within the central data processing system 10. The software instructions may be stored in the remote data storage device 14, for example.

The billing system comprises a revenue module 950 and a cost of sales module 972 that provide input data to the calculator 957. In turn, the calculator 957 provides data to an accounting transfer 959 module. The accounting transfer 959 module communicates with one or more accounting systems (e.g., first accounting system 960 and second accounting system 961). The first accounting system 960 may serve a group of dealers (e.g., first dealer 962, second dealer 963, third dealer 964, fourth dealer 965, and up to an Nth dealer 966, where N is whole number greater or equal to five in this example). A second accounting system 961 may serve one or more distributors (970, 967) and a service center 968.

The revenue module 950 further comprises a vehicle service component 951, a communication service component 952, and remote management database 953. The remote management database 953 stores records of transactions and other billing information.

The cost of sales module 972 comprises a telecom provider cost estimator 955, an information technology cost estimator 954, and a total cost of sales estimator 956. The information technology cost estimator 954 estimates the costs of maintaining and operating the central data processing system 10, one or more servers, and other hardware and infrastructure.

Having described the preferred embodiment, it will become apparent that various modifications can be made without departing from the scope of the invention as defined in the accompanying claims.

The following is claimed:

1. A method of performing diagnostics or software maintenance on a vehicle, the method comprising:
    storing or making accessible components of configuration files in a central data processing system consistent with vehicle electronics of a particular vehicle, the components of configuration files support electronic communication of the components by a common payload compatible with two alternate connections: a local connection comprising communication by a local diagnostic computer directly connected to the vehicle electronics through a wire, cable or wireless link and a remote connection comprising communication by a vehicle wireless communications device of the vehicle electronics over a communications network between the central electronic data processing system and the vehicle electronics;
    requesting an update of the stored configuration files for the vehicle from the central electronic data processing system based on a user request; and
    receiving the update of requested components of configuration files from the central electronic data processing system based on a comparison of a record of vehicle-installed configuration files and target configuration information, in the configuration files, stored at the central electronic data processing system.

2. The method according to claim 1 wherein the configuration files comprise a target list of software for loading on the vehicle, the target list associated with a corresponding valid time period.

3. The method according to claim 1 wherein the configuration files comprise an as-loaded list of software that is loaded on the vehicle in accordance with archived records of the central electronic data processing system.

4. The method according to claim 1 wherein the receiving at vehicle electronics from the central data processing system is accomplished via a communications network and wireless infrastructure, wherein the wireless infrastructure is selected from a group of communications systems comprising a land-based wireless system and a satellite system.

5. The method according to claim 1 wherein prior to the receiving the method further comprises:
    verifying the vehicle-installed configuration files by sending a software status inquiry message from the central data processing system to one or more controllers associated with the vehicle electronics.

6. A method of performing diagnostics or software maintenance on a vehicle, the method comprising:
    storing software components for vehicle electronics in a central data processing system;
    generating a common payload from the stored software components, the common payload compatible with a remote connection and a local connection to vehicle electronics in response to a request to update software on the vehicle electronics;
    receiving the generated common payload from the central data processing system; and
    installing the received, generated common payload in the vehicle electronics.

7. The method according to claim 6 further comprising:
    using common payload processing software at the central data processing system and a local diagnostic computer, where the central data processing system facilitates remote programming of the vehicle electronics via a communications network and wireless infrastructure, and wherein the local diagnostic computer facilitates local programming of the vehicle electronics via wireline or short-range wireless connection to a data port of the vehicle electronics.

8. The method according to claim 6 further comprising:
    using common payload processing software at the central data processing system to reprogram an engine controller and non-engine controller substantially simultaneously.

9. The method according to claim 6 further comprising:
    using common payload processing software at the central data processing system to reprogram a first controller that is functioning properly and to ignore a second controller that is malfunctioning.

10. The method according to claim 6 further comprising:
installing the generated common payload in a manner that allows the central data processing system to revert the vehicle electronics to a previous programming state, upon a request generated by a technician or user from a first service technician terminal, the second service technician terminal, or a user interface of the vehicle electronics.

11. The method according to claim 6 comprising:
displaying a status of the programming the common payload or a patch to a user via a user interface.

12. The method according to claim 11 further comprising:
allowing a user to control progress of the programming of the vehicle with the common payload or patch.

13. The method according to claim 1 wherein the stored components of the configuration files comprise target configurations for a corresponding vehicle identifier.

14. The method according to claim 1 wherein the configuration files comprise configuration data that is compatible with a controller for the particular vehicle.

15. The method according to claim 1 further comprising:
storing prior configuration data, prior calibration data, current payload data, current configuration data, and current calibration data in a data structure; and
rolling back the current configuration data, current payload data, or current calibration data of the vehicle electronics to an earlier configuration or calibration, as available in the stored prior configuration data or the prior calibration data.

16. The method according to claim 1 wherein the vehicle electronics and the local diagnostics computer are located at a service center.

17. The method according to claim 1 wherein the remote connection comprises a telematics connection.

* * * * *